US008424881B2

(12) United States Patent (10) Patent No.: US 8,424,881 B2
Vander Zaag et al. (45) Date of Patent: Apr. 23, 2013

(54) WHEEL SUPPORT FOR ADJUSTING THE GROUND CLEARANCE OF A VEHICLE

(75) Inventors: David Vander Zaag, Shelburne (CA); Daniel Mann, Glencairn (CA)

(73) Assignee: HJV Equipment, Alliston (CA)

( * ) Notice: Subject to any disclaimer, the term of this patent is extended or adjusted under 35 U.S.C. 154(b) by 440 days.

(21) Appl. No.: 12/869,397

(22) Filed: Aug. 26, 2010

(65) Prior Publication Data

US 2011/0049263 A1 Mar. 3, 2011

Related U.S. Application Data

(60) Provisional application No. 61/237,519, filed on Aug. 27, 2009.

(51) Int. Cl.
*B60G 17/00* (2006.01)

(52) U.S. Cl.
USPC .................................. 280/6.157; 280/43.17

(58) Field of Classification Search ........... 280/124.125, 280/5.514, 6.15, 6.157, 43, 43.17, 43.2, 43.21–43.23; 180/253, 209, 900; 254/418, 419, 423–425, 254/427

See application file for complete search history.

(56) References Cited

U.S. PATENT DOCUMENTS

| 4,619,340 | A  | 10/1986 | Elmer et al. |
| 6,257,361 | B1 | 7/2001  | Dickson |
| 6,357,770 | B1 * | 3/2002 | Carpiaux et al. ........ 280/124.127 |
| 7,837,207 | B2 * | 11/2010 | Kremmin et al. .......... 280/43.22 |
| 8,205,893 | B2 * | 6/2012 | Peterson et al. ........... 280/6.157 |

FOREIGN PATENT DOCUMENTS

FR 2 583 010 A1 * 12/1986

OTHER PUBLICATIONS

Kay Shipman, "High-rise highboy goes to extreme for cover crop project". Farm Week Now. http://www.farmweeknow.com/story.aspx/highrise/highboy/goes/to/extreme/for/cover/crop/project/4/40297. Jul. 22, 2010.

* cited by examiner

*Primary Examiner* — Ruth Ilan
(74) *Attorney, Agent, or Firm* — Bereskin & Parr LLP/S.E.N.C.R.L., s.r.l.

(57) ABSTRACT

A height adjustable wheel support apparatus includes an upper portion connectable to a frame of a vehicle and a lower portion that is connectable to a wheel assembly. An actuator is configured to move the upper portion between first and second positions. A spacer is movable between a storage position and a use position. In the use position the spaced is disposed between the upper and lower portions. When the upper portion is in the first position a downward facing bottom surface of the upper portion bears against a support surface on the lower portion, and when upper portion is in the second position the spacer is in the use position, between the upper and lower portions, and carries at least a portion of a load exerted by the upper portion.

30 Claims, 14 Drawing Sheets

WHEEL SUPPORT FOR ADJUSTING THE GROUND CLEARANCE OF A VEHICLE

CROSS-REFERENCE TO RELATED APPLICATIONS

This application claims the benefit of co-pending U.S. Provisional Application No. 61/237,519 filed Aug. 27, 2009, hereby incorporated in its entirety by reference.

FIELD

The invention relates generally to height adjustable vehicles, and in particular to a height adjustable wheel support for coupling a wheel assembly to a frame of a vehicle, such as for example, a crop spraying vehicle.
Introduction Farmers often spray crops with an agent such as a fertilizer, pesticide, or herbicide. One way of spraying these crops is using a self-propelled vehicle that travels along the rows of crops in a field, such as a crop sprayer. Vehicles, such as crop sprayers typically have a frame, and four or more wheels coupled to the frame. Crop sprayers also typically have booms extending outward from the sides of the frame, and a plurality of nozzles located along the length of the booms for spraying the agent onto the crops.

To enable a crop sprayer to spray crops in a field, the wheels of the crop sprayer are spaced apart by a predetermined crop spacing distance and the wheels and wheel supports are configured to provide a fixed ground clearance, between the ground and the crop sprayer frame, that exceeds the expected height of the crops during spraying. This allows the frame of the crop sprayer to avoid hitting and damaging the crops. However, in some instances, a farmer may wish to spray some crops early in their growing season when the crops are short and may wish to re-spray the crops (or spray other crops) later in the growing season when the crops are approaching or have exceeded the fixed ground clearance of crop sprayer. For example, when spraying corn it may be desirable to apply an agent, such as a herbicide or fungicide, when the corn reaches its tassel height.

To provide the desired ground clearance to spray taller crops some manufacturers provide crop sprayers having a higher, fixed ground clearance while other manufacturers provide a bolt-on lift kit assembly that can be used to increase the ground clearance of an existing crop spraying vehicle. For example, Deere & Company provides a fixed length high-clearance, bolt-on lift kit for modifying the ground clearance of its crop sprayers. The kit generally consists of four static assemblies (one per wheel) that are installed between the wheels and the existing wheel supports. These assemblies are designed to give the sprayer additional ground clearance. Installation of the assemblies can be completed in approximately four hours, but more time is often needed to add additional shielding and to make commonly used functions of the machine more accessible.

Higher crop spraying machines may be difficult to transport between farms or fields, as the height of the crop sprayer may be limited by road transportation issues, such as bridge clearances and laws that limit the height or ground clearance of vehicles driving on public roads. These transportation issues may be particularly relevant to companies that offer crop spraying services, because such companies need to frequently transport crop spraying vehicles between a number of locations. Using a fixed length, bolt-on lift kit, a machine operator may need to spend considerable time in the work day installing the lift kit prior to use, and then additional time removing the static lift kit prior to transporting the crop sprayer along public roads to a different location.

U.S. Pat. No. 6,257,361 (Dickson) discloses a high clearance converter used for converting a road vehicle, e.g. a pickup truck, to a high clearance vehicle, for example for agricultural use. The converter has front and rear frame components, each with two upright and ground wheels mounted on each of the legs. The front wheel hubs are mounted on the front frame component and the rear axle is mounted on the rear frame component. The front and rear frame components are coupled for relative rolling movement with respect to one another, allowing the frame to flex when travelling over uneven ground.

U.S. Pat. No. 4,619,340 (Elmer et al.) discloses a vehicle having a frame, wheel assemblies connected to the frame, and a lateral support assembly connected between each of the front wheel assemblies and the rear wheel assemblies. Each wheel assembly is pivotally connected by an upper pivot member to an upright post. A collar is slidable up and down on each post. Bracing hydraulic cylinders connect between the support assembly and the wheel assemblies. A control circuit for the cylinders with a control valve maintains the wheel assemblies upright. Elevator hydraulic cylinders transmit the weight of the frame to the wheels. A control circuit with position control valves automatically adjusts the elevator hydraulic cylinders to hold the frame at a preset elevation and a control circuit with position control valves automatically adjusts the wheel spacing hydraulic cylinders to hold the wheels at a preset spacing. A control circuit regulates the speed and direction of hydrostatic motors on the wheels and the turning of the wheels.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

According to a first broad aspect, a height adjustable wheel support apparatus for a vehicle includes an upper portion that is connectable to a frame of the vehicle and a lower portion that is connectable to a wheel assembly. The apparatus also includes an actuator that is configured to move the upper portion between first and second positions and a spacer that has a first and an opposing second end. The spacer is movable between a storage position and a use position. In the use position, the spacer is positioned between the upper and lower portions. When the upper portion is in the first position the spacer is in the storage position and a downward facing bottom surface of the upper portion bears against a support surface on the lower portion. When upper portion is in the second position, the upper portion and lower portion are spaced apart and the spacer is in the use position, wherein the first end of the spacer bears against the lower portion and the second end of the spacer bears against the upper portion to carry at least a portion of a load exerted by the upper portion.

In some examples, when the upper portion is the second position, the upper portion and lower portion are spaced apart by a spacer height and the upper portion is moveable to a third position where the upper and lower portions are spaced apart by a distance greater than the spacer height.

In some examples, the spacer is releasable from the use position when the upper portion is in the third position and the spacer is releasably locked in the use position between the upper and lower portions when the upper portion is in the second position.

In some examples, the spacer is pivotably and translatably connected to the upper portion.

In some examples, the upper portion includes a pair of pins extending from opposing faces of the upper portion and the spacer comprises a corresponding pair of support brackets. Each support bracket has a slot therein to slidably and rotatably receive one of the pins.

In some examples, the apparatus also includes a linkage assembly operably connecting the spacer to the lower portion. The linkage assembly is adapted to guide the spacer between the storage position and an intermediate position when the upper portion is moved relative to the lower portion.

In some examples, the linkage assembly includes a connecting rod pivotally connected to one of the spacer and the lower portion, the connecting rod has a slot therein to slidably receive a pin provided on the other of the spacer and the lower portion.

In some examples, the slot in the connecting rod includes a lifting portion and a catch portion, the lifting portion configured to slidably receive the pin and the catch portion is configured to receive the pin to retain the spacer in the intermediate position.

In some examples, the first end of the spacer comprises one of a boss and a complimentary slot and the lower portion comprises the other of the boss and the slot. The boss is received in the slot when the upper portion is in the second position.

In some examples, the boss is disengaged from the slot when the upper portion is in the third position. The boss is adapted for insertion into the slot by the movement of the upper portion from the second position to the third position.

In some examples, when spacer is in the use position, the spacer carries a greater load than the actuator.

In some examples, the actuator is substantially unloaded when the upper portion is in the first position and the second position.

In some examples, the spacer has an interior volume. When the spacer is in the use position, at least a portion of the actuator is contained within the interior volume.

In some examples, the apparatus also includes a guide member extending from the lower portion to the upper portion. The guide member is adapted to carry at least a portion of at least one of shear, bending and torque loads exerted by the frame. The guide member extends generally parallel to the actuator.

In some examples, the guide member is an elongated member extending between the upper and lower portions. The elongated member is slidably received within a sleeve in the upper portion.

In some examples, the elongated member has a member length and the corresponding sleeve has a sleeve length that is less than the member length. The elongated member is at least partially received within the sleeve when the upper portion is in each of the first, second and third positions.

In some examples, the apparatus also includes a first guide member and a generally parallel second guide member. The second guide member is spaced apart from the first guide member. The first and second guide members are generally parallel to the actuator and are oriented co-planar with the actuator. The actuator is located between the first and second guide members.

In some examples, the apparatus also includes a first actuator and a second actuator. The first and second actuators are positioned on opposite sides of an axis of rotation of the wheel assembly.

In some examples, the upper portion extends along a first axis and the lower portion moves relative to the upper portion along a second axis. The second axis is disposed at an angle to the first axis.

In some examples, the first axis is at a first acute angle relative to a vertical axis and the second axis is at a second acute angle relative to the vertical axis, the second angle being smaller than the first angle.

In some examples, the spacer is removably connected to at least one of the upper and lower portions and is separable from the upper and lower portions when the spacer is in the storage position.

According to another broad aspect, a height adjustable crop spraying vehicle includes a frame and a liquid holding tank supported by the frame that is in fluid communication with at least one spraying boom mounted to the frame. The vehicle also includes a plurality of wheels to rollingly support the frame and an plurality of height adjustable wheel supports connecting each wheel to the frame. Each wheel support is selectably adjustable to vary the elevation of the frame relative to the ground. Each wheel support includes an upper portion connected to the frame and a lower portion connected to one of the plurality of wheels. The wheel support also includes an actuator configured to move the upper portion relative to the lower portion between a first position and a second position. Each wheel support also includes a spacer that is moveable between a storage position and a use position. In the use position, the spacer is disposed between the upper and lower portions to transfer at least a portion of a load exerted by the frame from the upper portion to the lower portion. When the upper portion is in the first position a bottom surface of the upper portion bears against a support surface of the lower portion and the vehicle is in a lowered configuration. When the upper portion is in the second position, the spacer is in the use position, a first end of the spacer bears against the support surface, and an opposing second end of the spacer supports the bottom surface of the upper portion, and the vehicle is in a raised configuration.

In some examples, the upper portion is moveable beyond the second position to a third position in which a distance between the bottom surface and the support surface is greater than a spacer height.

In some examples, the spacer is positionable between the upper and lower portions when the upper portion is in the third position. The spacer is restrained from movement between the upper and lower portions when the upper portion is in the second position.

In some examples, the plurality of wheels includes a pair of opposing, spaced apart steerable front wheels and a pair of opposing, spaced apart rear wheels.

In some examples, the upper portion of the wheel support extends from the frame along a first axis at a first angle relative to a vertical axis. The lower portion is moveable relative to the upper portion along a second axis at a second angle relative to the vertical axis. The second angle is smaller than the first angle. When the vehicle is in the lowered configuration opposing ones of the plurality of wheels are spaced apart by a first width to accommodate a predetermined spacing between rows of crops. When the vehicle is in the raised configuration the opposing ones of the plurality of wheels are spaced apart by a second width that is different than the first width and can also accommodate the predetermined spacing so the opposing ones of the plurality of wheels can fit between the rows of crops when the vehicle is in the raised configuration.

In some examples, each wheel support is independently controllable and can be adjusted independently of any of the other wheel supports.

In some examples, the spacer has an interior volume and at least a portion of the corresponding actuator is disposed within the interior volume when the spacer is in the second position.

In some examples, the spacer also includes an angled end face extending between the first and second ends, wherein the end face is configured to guide crops around the spacer when the vehicle moves through a field.

According to another broad aspect, a height adjustable wheel support includes an upper portion that is connectable to the frame of the vehicle and a lower portion that is connectable to the wheel assembly. The wheel support also includes an actuator that is configured to move the upper portion between first and second positions. A guide member extends from the lower portion and slidably received within the upper portion. The guide member is securable to the upper portion. When the upper portion is in the first position, a bottom surface of the upper portion bears against a support surface of the lower portion. When the upper portion is in the second position, the bottom surface of the upper portion is spaced apart from the support surface of the lower portion and the guide member is releasably secured to the upper portion to carry at least a portion of the load exerted by the upper portion.

DRAWINGS

The drawings included herewith are for illustrating various examples of articles, methods, and apparatuses of the present specification and are not intended to limit the scope of what is taught in any way. In the drawings.

DESCRIPTION OF VARIOUS EMBODIMENTS

The following description is not to be considered as limiting the scope of any claimed invention.

Figure 1:
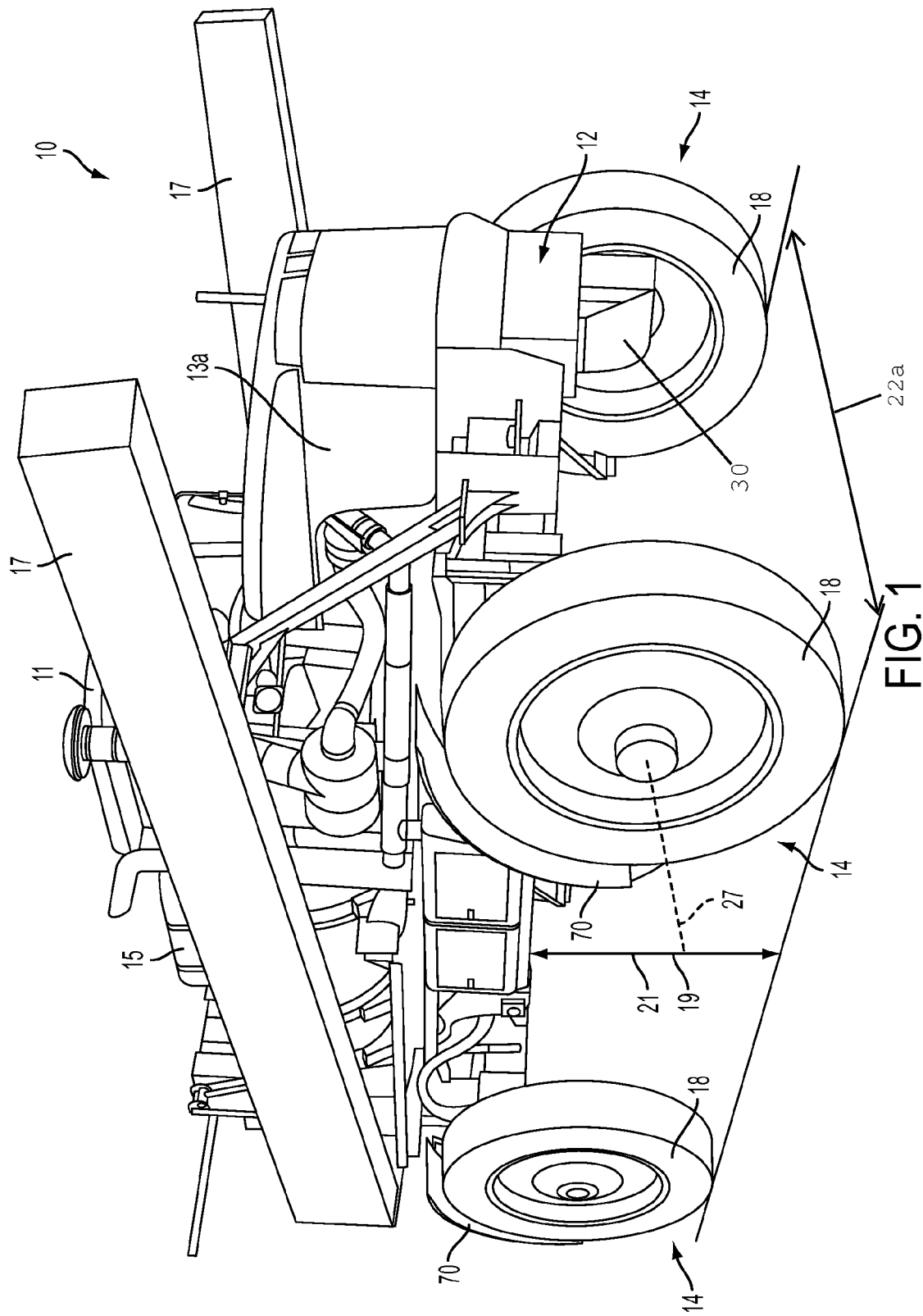
FIG. 1 is a perspective view of a crop sprayer in a lowered position.
Figure 2:
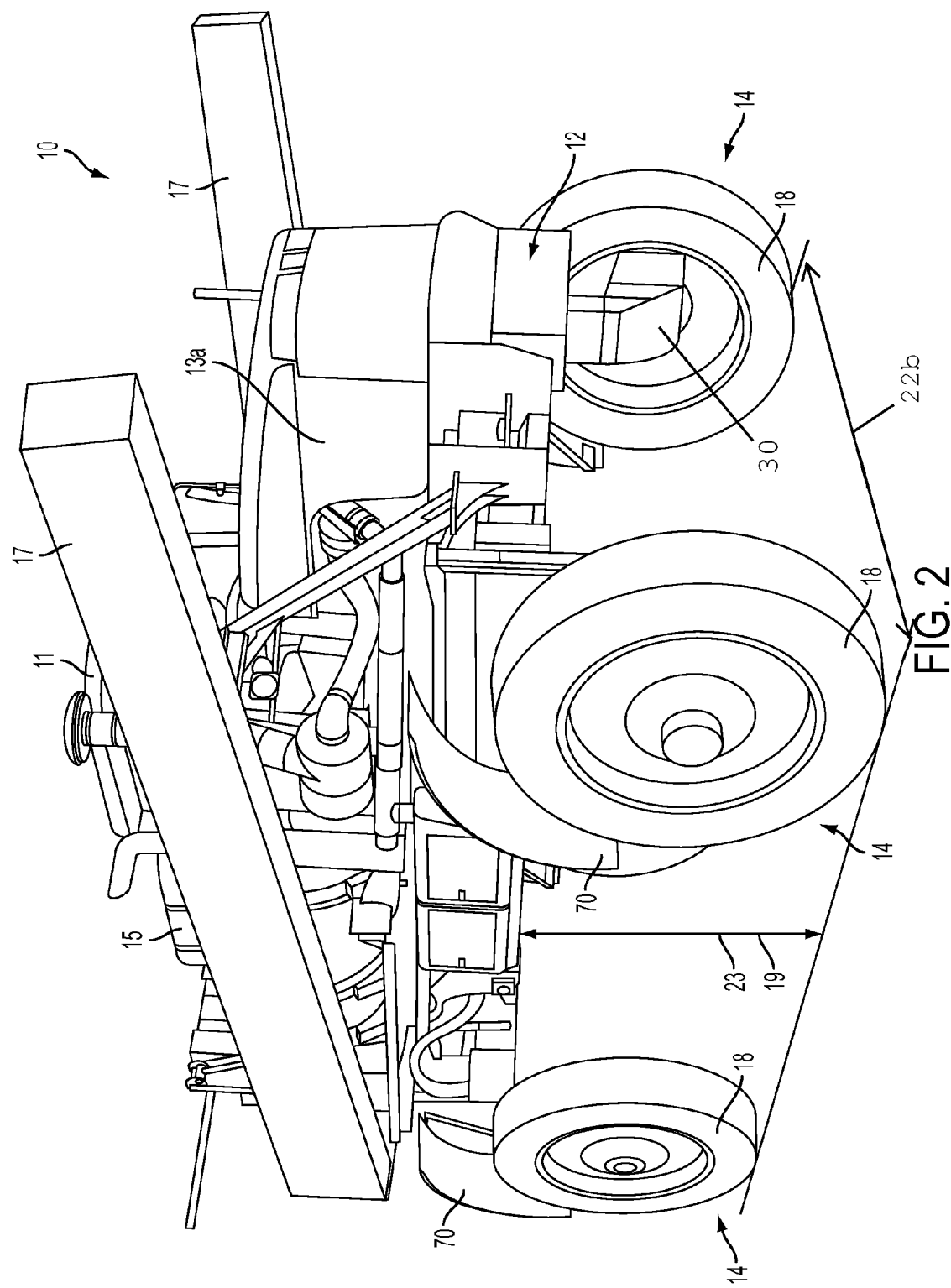
FIG. 2 is a perspective view of the crop sprayer of FIG. 1 in a raised position.

Referring to FIGS. 1 and 2, a vehicle is illustrated in a lowered position and a raised position respectively. In the present example, the vehicle is a self-propelled crop sprayer 10 that is selectably moveable between a first or lowered position, as shown in FIG. 1, and a second or raised position, as shown in FIG. 2. In other examples, the vehicle may be a spreader, a tractor, a pull-type crop sprayer or any another suitable vehicle that can be operated at at least two different heights. It will be understood by those skilled in the art that the crop sprayer 10 may be operated at more than two different heights.

The crop sprayer 10 includes a frame 12 that is supported by four wheel assemblies 14. The frame 12 supports an operator cabin or cab 11, motor or engine 13a, a pair of spraying booms 17, and a liquid holding tank 15. The crop sprayer 10 also includes a plurality of adjustable wheel supports 30 that connect the frame 12 to the wheel assemblies 14. The frame 12, supported by the combination of the wheel assemblies 14 and the adjustable wheel supports 30, also defines a ground clearance 19, which is the distance between the ground (for example a farm field or roadway surface) and the frame members. Alternatively, the vehicle may comprise more than four wheel assemblies (e.g. a six wheeled vehicle) or the vehicle may comprise fewer than four wheel assemblies (e.g. a three wheeled self-propelled crop sprayer or a two wheeled pull-type vehicle). Also, each wheel assembly 14 may comprise more than one wheel 18, for example each wheel assembly 14 may comprise two or more wheels 18 in a parallel or dual-wheel configuration.

In FIGS. 1 and 2, the spraying booms 17 are schematically represented as elongated, rectangular members connected to the rear of the frame 12. It is understood that the spraying booms 17 may be any suitable spray booms known in the art that comprise a plurality of nozzles (not shown) for spraying liquid. The nozzles may be of any suitable configuration and may be connected to the liquid holding tank 15 by any known conduit, such as flexible hoses, rigid pipes or any combination thereof. The spraying booms 17 may be pivotally connected to the frame 12 so that they can pivot between a storage or travel position, shown in FIGS. 1 and 2, and an extended or use position (not shown) in which the spraying booms 17 extend outwardly, away from the crop sprayer 10 to cover multiple rows of crops. In the present example, the spraying booms 17 are connected to the frame toward the rear of the crop sprayer 10. In other examples of crop sprayers 10, the spraying booms may be connected to the frame toward the middle of the crop sprayer, toward the front of the crop sprayer (i.e. forward of the operator cabin) or any other suitable location.

Figure 3:
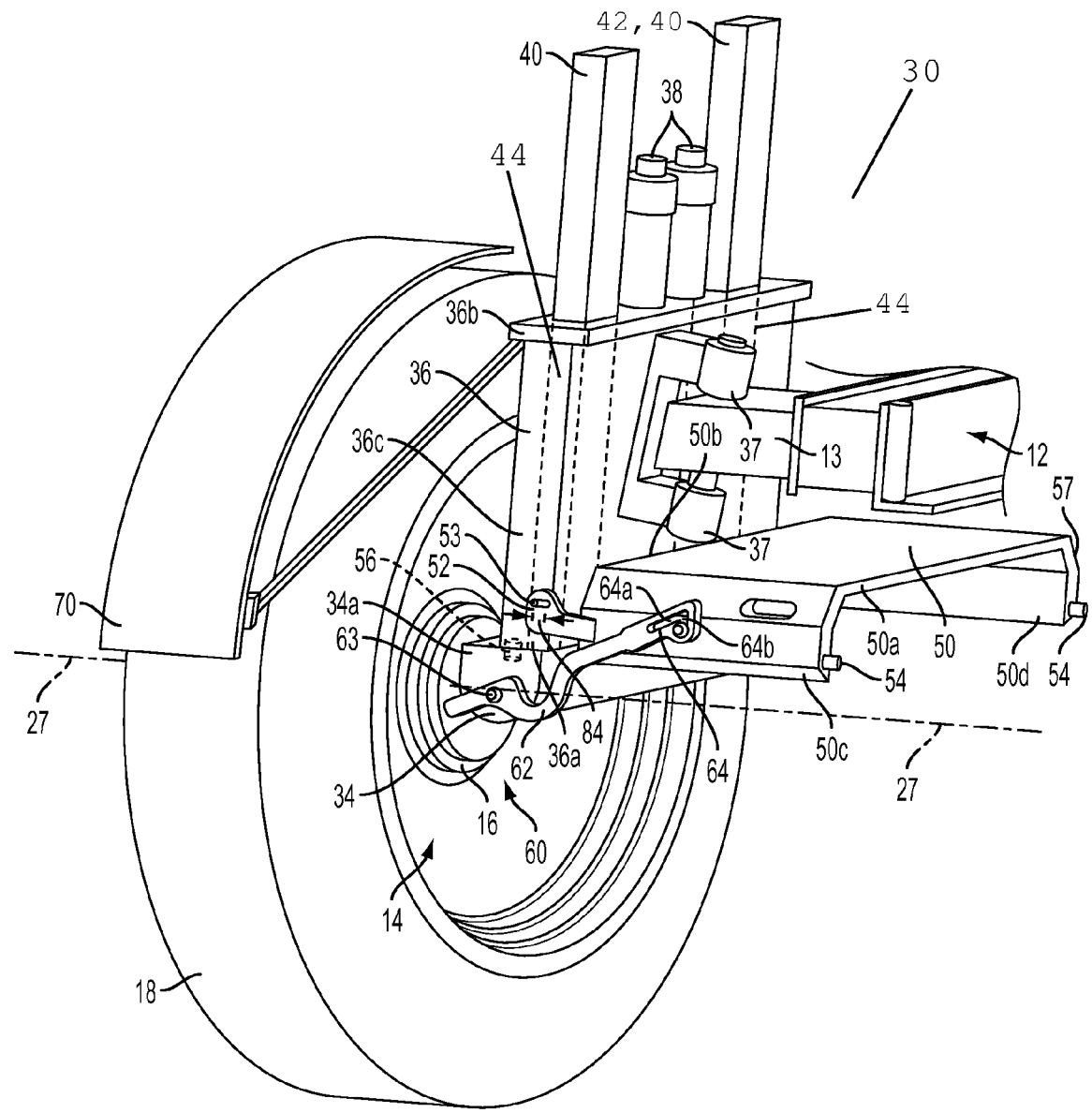
FIG. 3 is a perspective view of an adjustable wheel support for coupling a wheel assembly to a frame of the crop sprayer of FIG. 1.

Referring now to FIG. 3, each wheel assembly 14 includes a hub 16 and a wheel 18 rotatably coupled to the hub 16. Each hub 16 may include a motor (not shown) for independently driving and/or steering each respective wheel. In some examples the motor driving the wheels may be a hydraulic motor fluidly connected to a hydraulic system on the crop sprayer 10. Optionally, all of the wheel assemblies 14 may be configured to be powered in unison (i.e. each wheel 18 is driven at the same time and with the same intensity as every other wheel), or the wheel assemblies 14 can be configured so that at least some of the wheels 18 can be independently driven. In other examples, the motor driving the wheels may be an electric motor, a diesel motor or any other suitable motor.

As least some of the wheel assemblies 14 are steerable wheel assemblies that are pivotally or otherwise movably connected to the frame 12 and coupled to a steering system (not shown) to enable steering and manoeuvring of the crop sprayer 10. The steerable connection between the wheel assemblies 14 and the frame 12 may be any suitable steering connection or mechanism. Optionally, all of the wheel assemblies may be steerable.

Referring to FIGS. 3 to 12, an example of an adjustable wheel support 30, or portions thereof, used to connect a wheel assembly 14 to the frame 12 is shown. As described in greater detail below, each adjustable wheel support 30 selectably moveably between a lowered position, and a raised position to adjust the ground clearance 19 of the crop sprayer 10, as illustrated in FIGS. 1 and 2. FIGS. 3 to 12 illustrate one example of an adjustable wheel support 30 connecting a wheel assembly 14 to the front of the frame 12. To provide steering for the crop sprayer 10, the adjustable wheel supports 30 connected to the front wheels are pivotally connected to the frame 12. Optionally, the wheel supports 30 at the rear end of the crop sprayer 10 can be rigidly or fixedly connected to the frame 12 or the rear wheel supports 30 can also be pivotally connected to the frame 12 to provide four-wheel steering.

In the present example, the adjustable wheel supports 30 are provided in the form of a replacement assembly for replacing existing or stock, fixed-height wheel supports provided by the original manufacturer of the crop sprayer 10. Providing adjustable wheel supports 30 as modified or replacement parts may enable farmers and machine operators to retrofit, modify, re-configure or upgrade their existing crop spraying machines to become height-adjustable instead of having to purchase a new, variable height crop sprayer. This may lower the cost to the farmers and machine operators. In this example, each adjustable wheel support 30 may comprise a mixture or combination of stock (i.e. manufacturer supplied) parts and new or custom parts. In other examples, the adjustable wheel support 30 may be a manufacturer-supplied feature on the crop sprayer 10.

Figure 6:
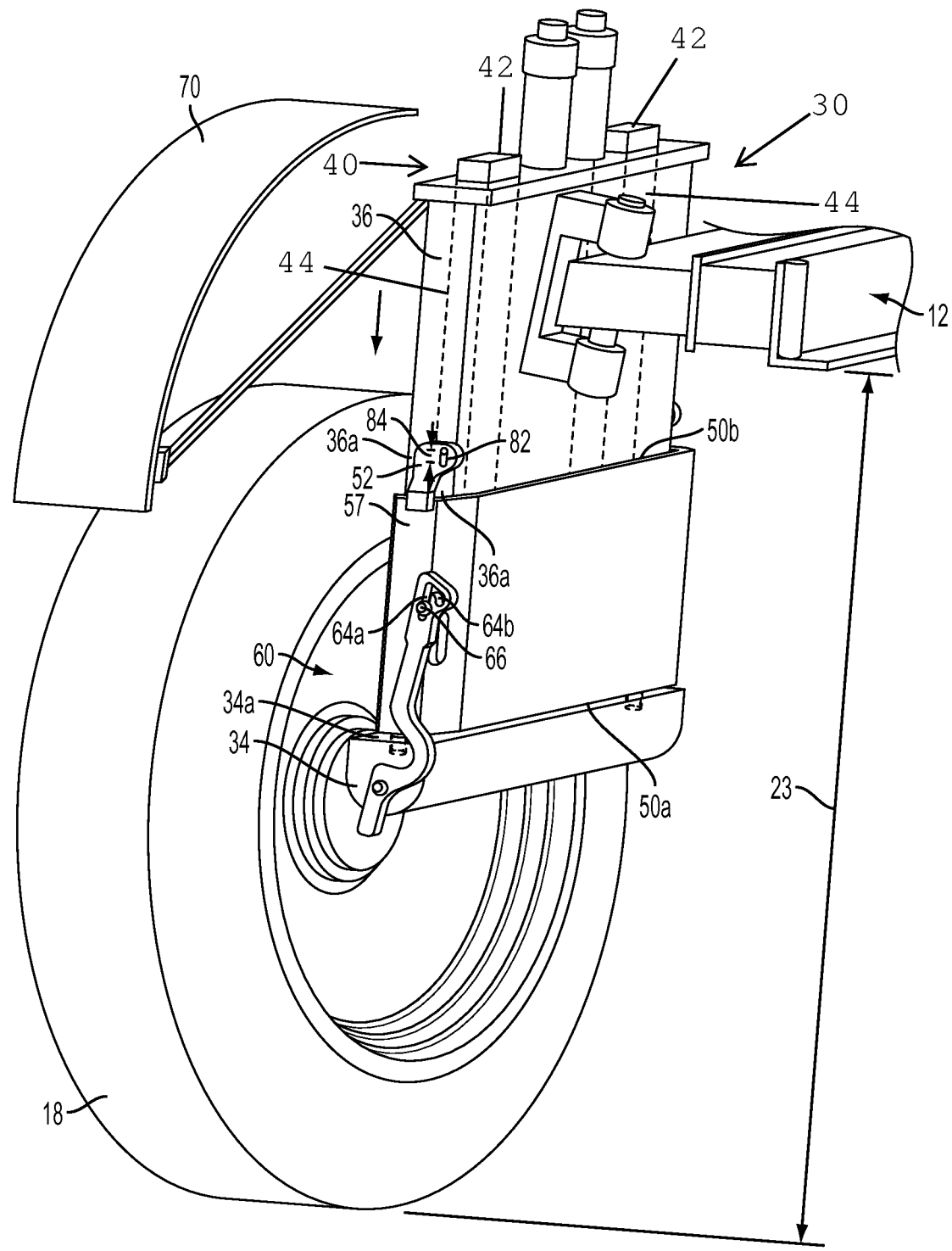
FIG. 6 is a perspective view of the wheel support of FIG. 3 with the spacer in a second position so that the ground clearance of the frame has a second height.
Figure 7:
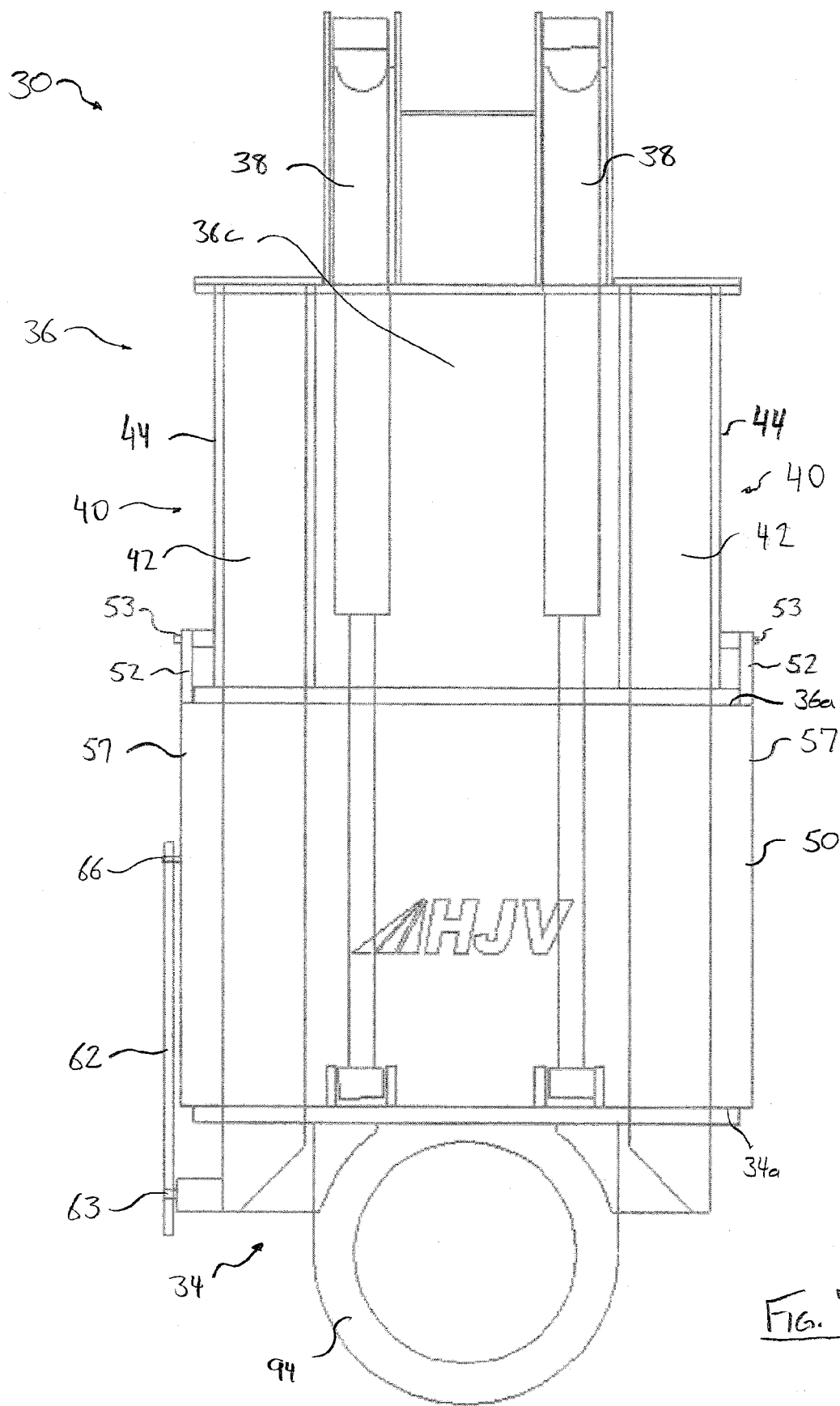
FIG. 7 is a side view of an adjustable wheel support in a raised configuration according to an exemplary embodiment of the invention.
Figure 8:
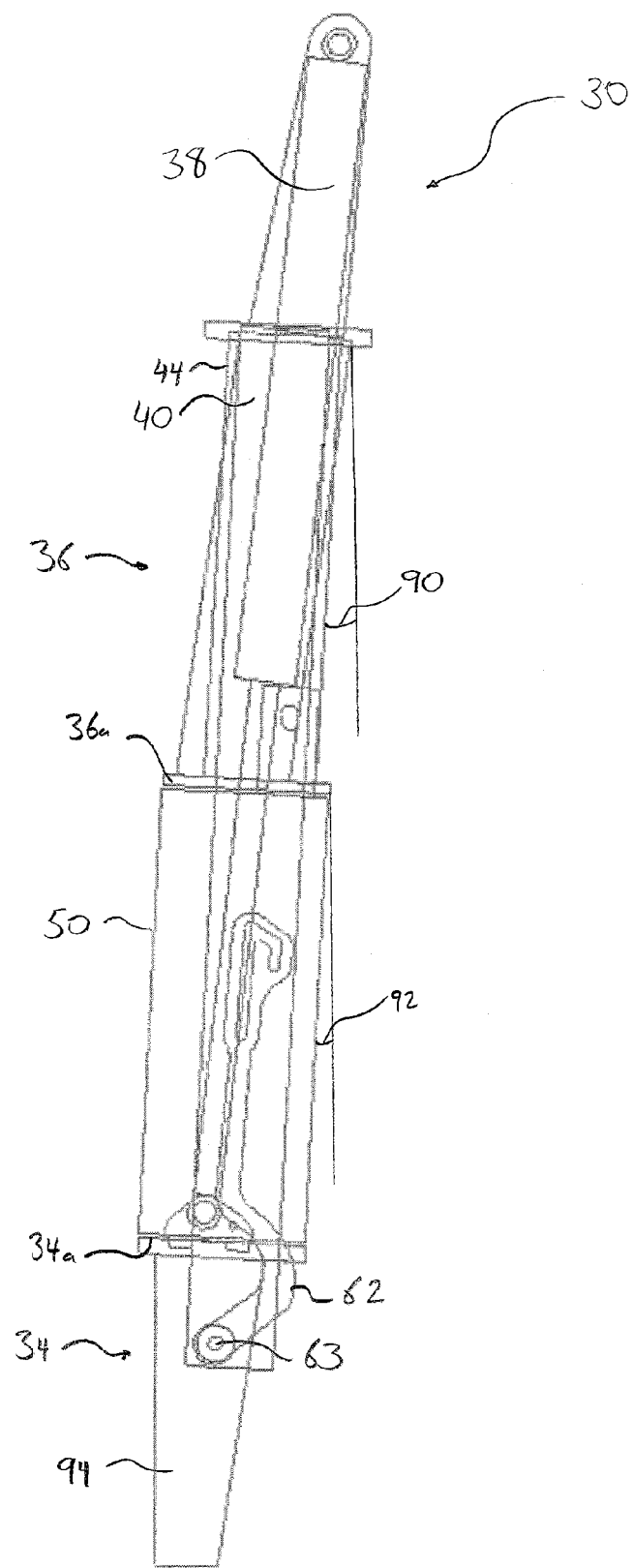
FIG. 8 is an end view of the adjustable wheel support of FIG. 7.
Figure 9:
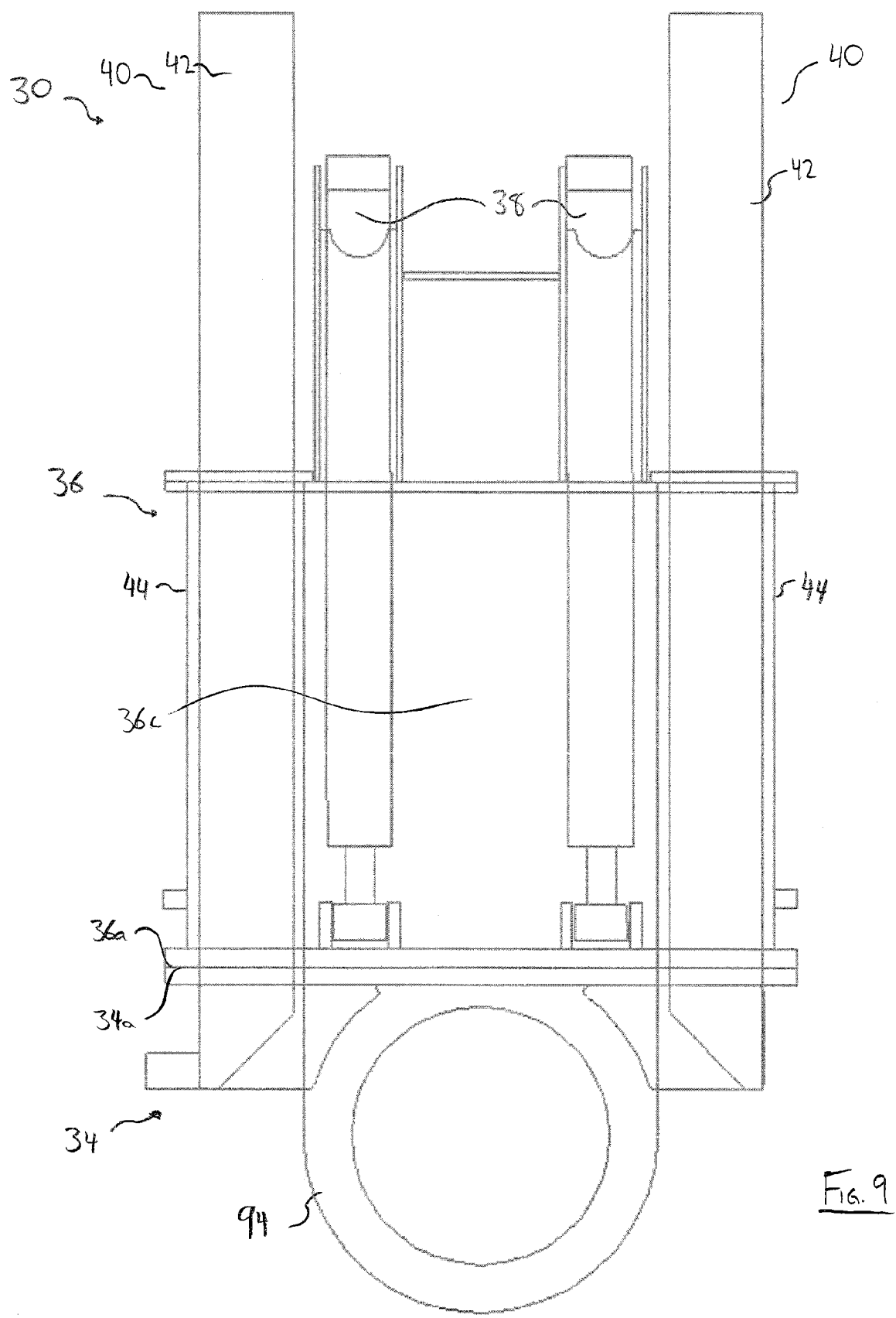
FIG. 9 is a side view of the adjustable wheel support of FIG. 7 in a lowered configuration.
Figure 10:
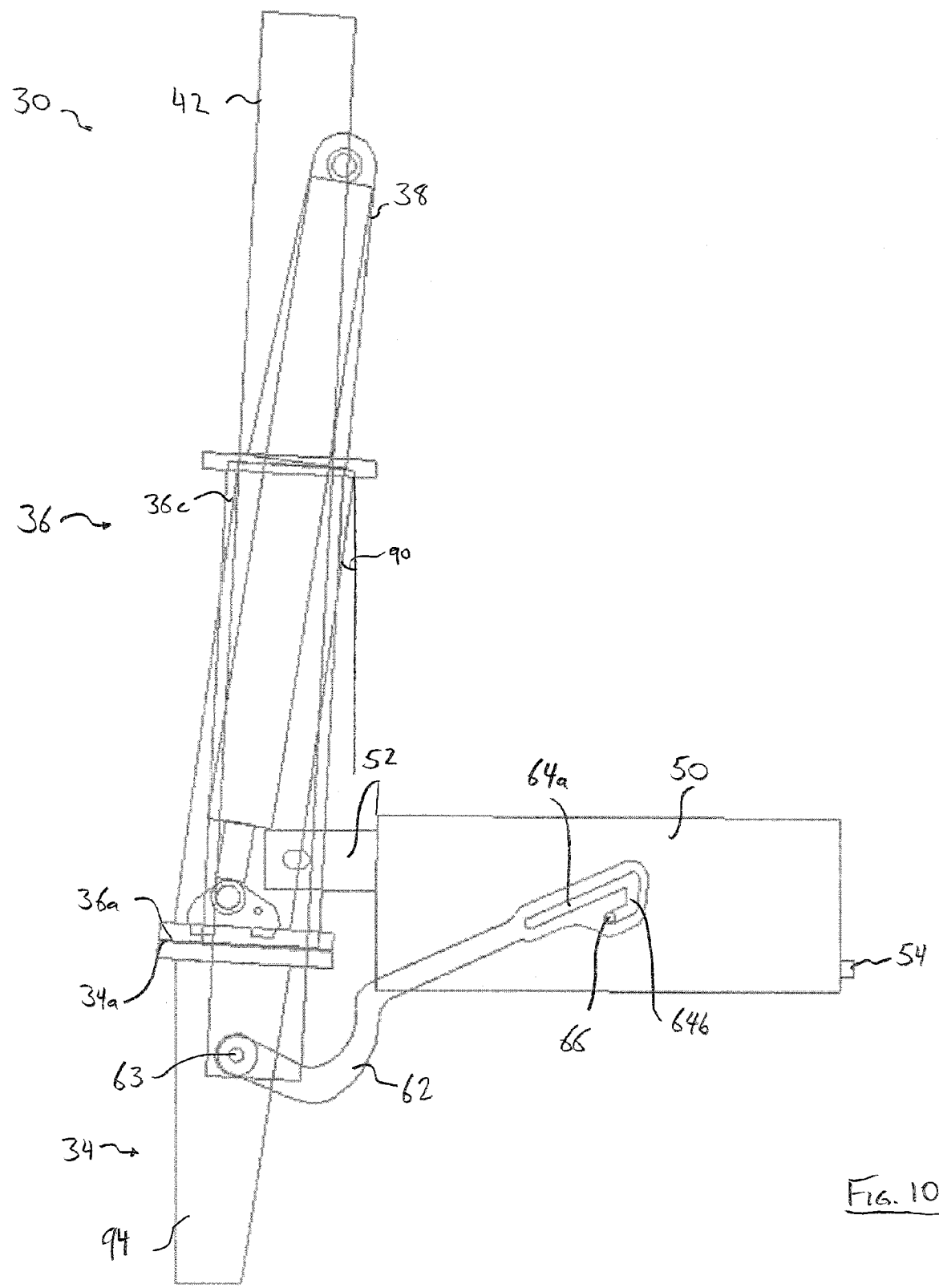
FIG. 10 is an end view of the adjustable wheel support of FIG. 9 showing the spacer in a lateral storage position.
Figure 11:
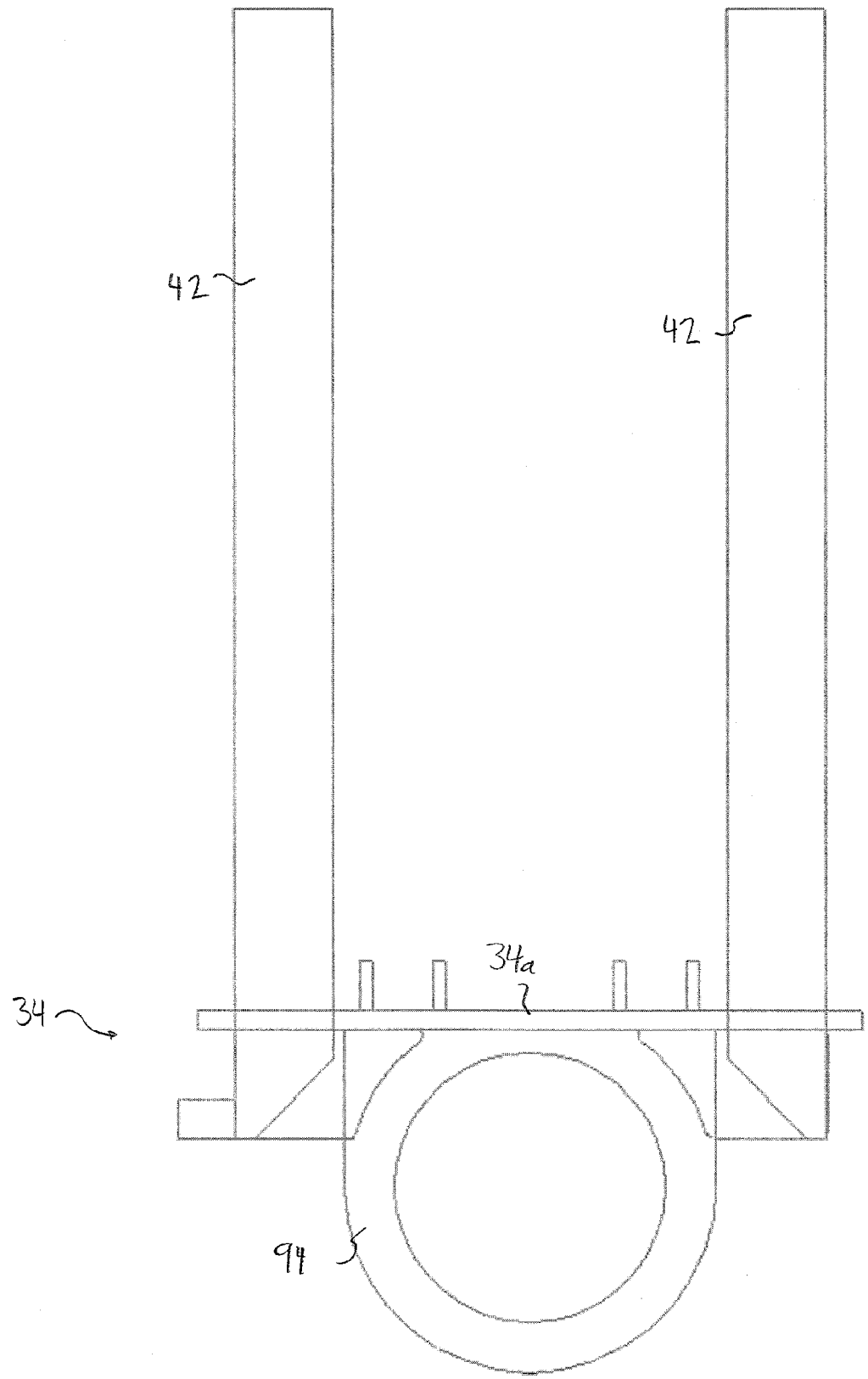
FIG. 11 is a side view of a lower portion of an adjustable wheel support according to an exemplary embodiment of the invention.
Figure 12:
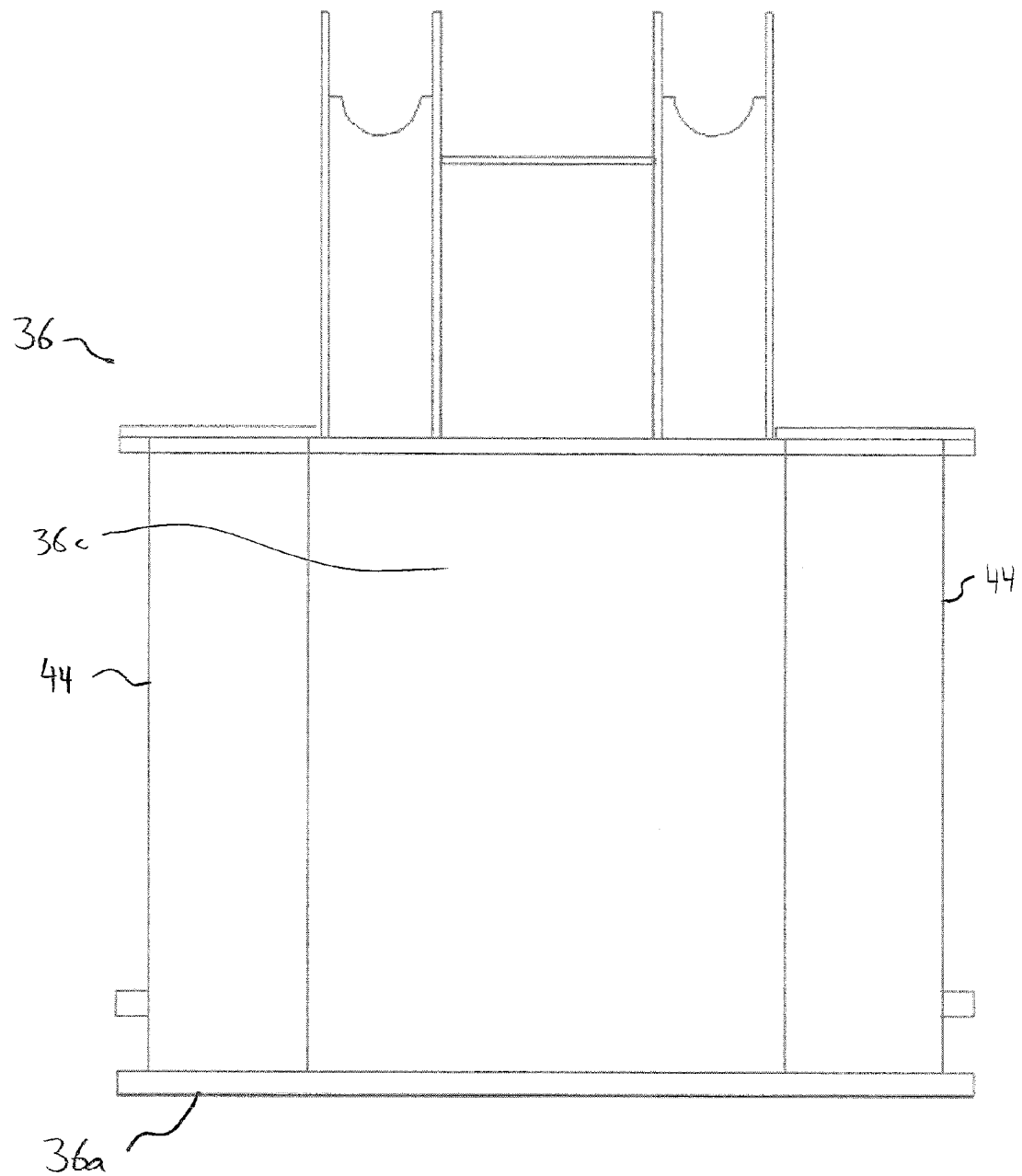
FIG. 12 is a side view of an upper portion of an adjustable wheel support according to an exemplary embodiment of the invention.

Each adjustable wheel support 30 includes a lower portion 34, a complimentary upper portion 36 and a moveable support apparatus that can lock the position of the lower portion 34 relative to the upper portion 36 and carry at least a portion of the load placed on the wheel support. In this example, the support apparatus includes a support plate or spacer 50. The lower portion 34 is configured to be coupled to the wheel assembly 14 of the vehicle 10 and the upper portion 36 is configured to be connected to the frame 12 of the vehicle 10. Each wheel support also comprises at least one actuator 38 operably connected to the lower portion 34 and the upper portion 36. The lower portion 34 is selectably moveable relative to the upper portion 36 using the actuator 38. When the adjustable wheel support 30 is in its first, or lowered position, as shown in FIGS. 3, 9 and 10, the upper portion 36 sits upon, and is supported by, the lower portion 34. When the adjustable wheel support is in its second, or raised position, as shown in FIGS. 6, 7 and 8 the upper portion 36 is separated from the lower portion 34 by the spacer 50. In the raised position, the spacer 50 contacts the upper and lower portions 36, 34 and carries at least a portion of the load placed on the adjustable wheel support 30. When the adjustable wheel support 30 is in the raised position, the spacer 50 carries substantially the entire load transferred between the upper and lower portions 36, 34, reducing the axial load placed on the actuator 38. While the actuator 38 is used to provide the lifting force required to lift the vehicle into the raised position, the load carried by the actuator 38 is reduced and optionally eliminated when the spacer 50 is in position. Alternatively, the guide members 40, actuators 38 or other components of the wheel support 30, can be configured to carry a portion of the load between the lower portion 34 and upper portion 36.

In the present example, the adjustable wheel support 30 comprises a pair of, parallel, spaced apart actuators 38. Each actuator 38 is a hydraulic actuator comprising a cylinder that is connected to the upper portion 36 and a piston, telescopically received within the cylinder, which is connected to the lower portion 34. The cylinder and the piston may be connected to the upper and lower portions 36, 34 respectively, in any suitable manner, such as for example using pin connections, rivets, bolts, screws, weldment and other chemical or mechanical fasteners. In other examples, the actuators 38 may be any other suitable actuator operable to move the lower portion 34 of the adjustable wheel support 30 away from the upper portion 36, including without limitation electric actuators, servo motors, ball screws, cables, chain drives, belts and pulleys and pneumatic actuators.

Figure 13:
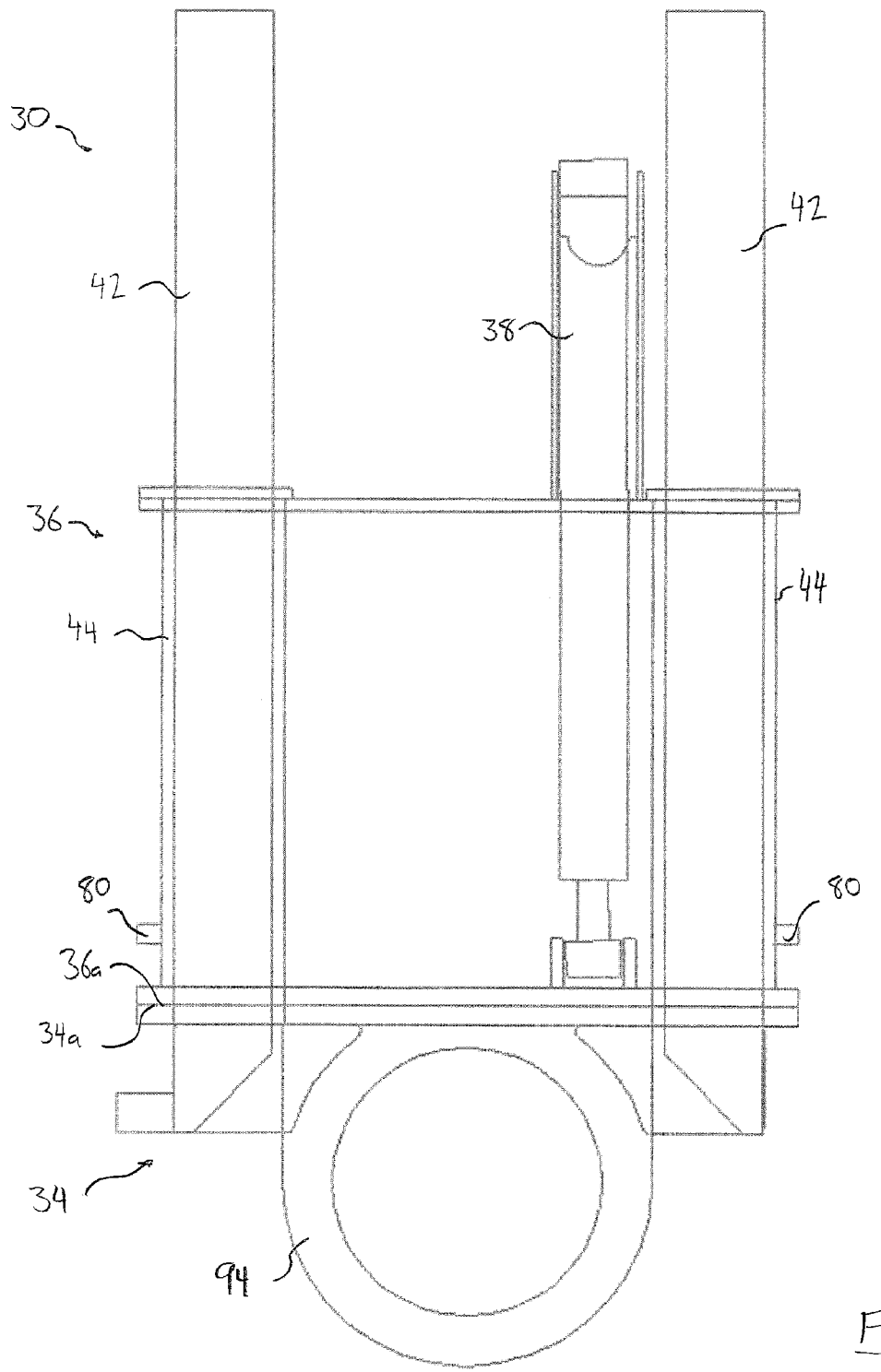
FIG. 13 is a side view of an adjustable wheel support comprising a single, offset actuator.
Figure 14:
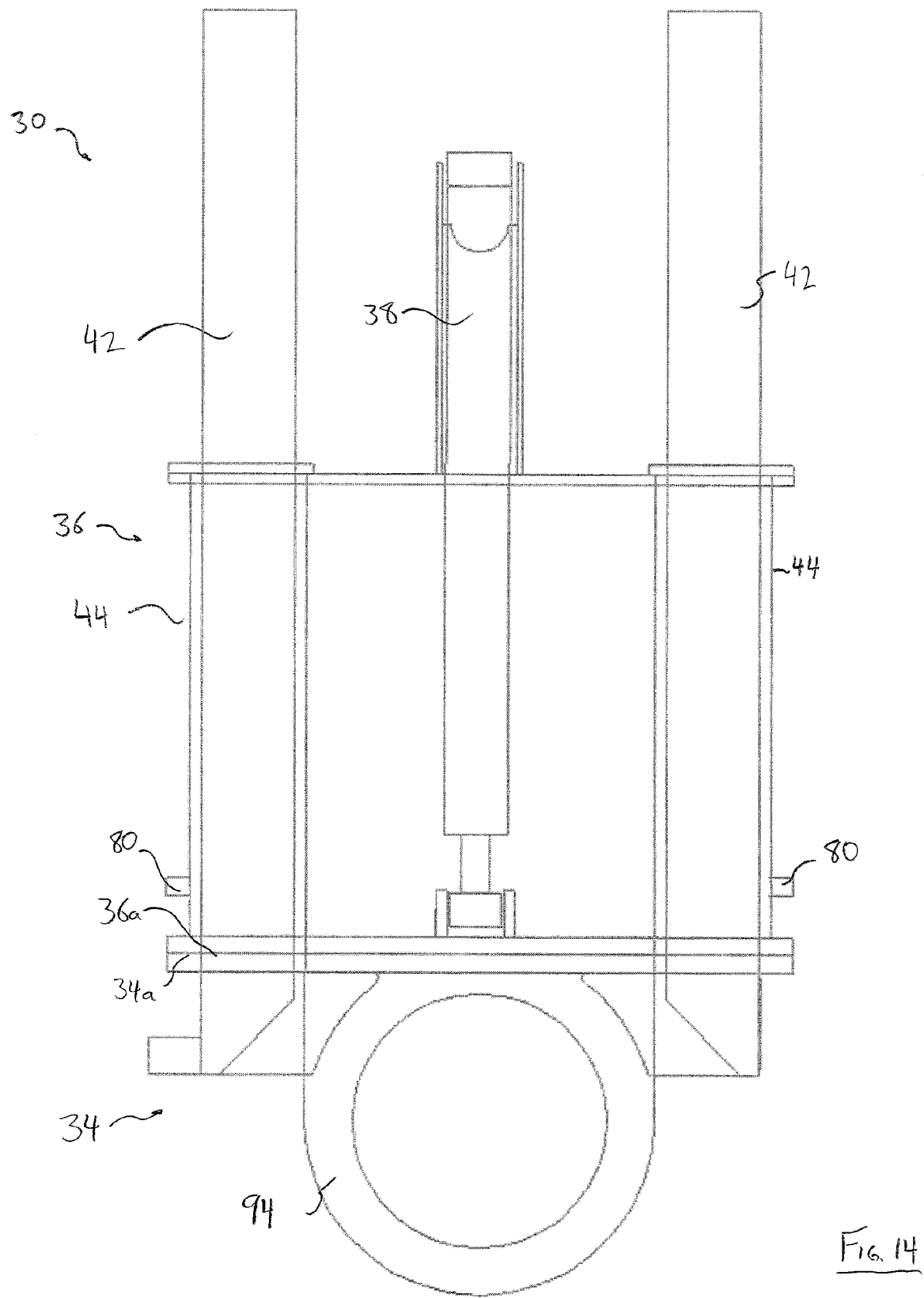
FIG. 14 is a side view of an adjustable wheel support comprising a single, centred actuator.

Providing a pair of spaced apart actuators 38, on opposing sides of the axis of rotation 27 of the wheel assembly, may allow each actuator to be relatively small and may produce a lifting force that is balanced relative to the axis of rotation 27 of the wheel 18 and the frame 12, which may reduce the bending or moment loads placed on the actuators 38 or other components of the wheel support 30. In other examples, the adjustable wheel support 30 may include more than two actuators, or a single actuator 38 that is offset from the axis of rotation 27 of the wheel 18 (either in front of or behind the axis), as shown in FIG. 13, or a single actuator 38 that is centred relative to the wheel 18, and positioned generally between the axis of rotation 27 of the wheel 18 and the frame 12, as shown in FIG. 14.

When activated by a machine operator, the hydraulic actuators 38 move from a retracted position toward an extended position, and move the lower portion 34 away from the upper portion 36. When the lower portion 34 moves away from the upper portion 36 (also described as the upper portion 36 being raised or lifted relative to the lower portion 34) the distance between the wheel 18 and the frame 12 increases, thereby increasing the ground clearance 19 of the crop sprayer 10. For example, the ground clearance 19 of the frame 12 may have a first height 21 in a lowered position as shown in FIG. 1, and the ground clearance 19 of the frame 12 may have a higher, second height 23 in a raised position as shown in FIG. 2.

When provided as a replacement part, the lower portion 34 is configured to be coupled to the wheel assembly 14 of the crop sprayer 10 that is being converted into an adjustable height crop sprayer. The particular configuration of the lower portion 34 may be selected based on the design and configuration of the wheel assembly 14 of the crop sprayer 10 to be modified. In the present example, the lower portion is coupled to the hub 16 of the wheel assembly 14 using one or more fasteners, such as bolts, weldments, or another suitable fastener. The lower portion 34 may comprise a complimentary flange 94 that abuts with and connects to the hub 16. The connection between the lower portion 34 and the hub 16 allows for the use of a variety of tires on the wheels 18, including standard row crop tires (for example between 12-14 inches in width) and wider, floater tires (for example approximately 18-24 inches wide).

The lower portion 34 supports the weight or load of the frame 12 and the upper portion 36 when the upper portion 36 is lowered onto the lower portion 34. Accordingly, the lower portion 34 generally has a surface shaped to receive a corresponding surface on the upper portion 36. In the present example, the lower portion 34 has a support surface 34a that is generally planar and is shaped to form a seat for abutting and supporting a corresponding or complimentary bottom surface 36a of the upper portion 36, as shown in FIG. 3. When the adjustable wheel support 30 is in the extended position, as shown in FIGS. 6, 7 and 8, instead of receiving the bottom surface 36a the support surface 34a engages and supports a first end 50a of the spacer 50, and the bottom surface 36a engages and is supported by a top or second end 50b of the spacer 50. Optionally, the support surface 34a and bottom surface 36a may be integral with the upper and lower portions 36, 34 respectively, or they may be separate plates or other structural members.

In the present example, the upper portion 36 comprises housing 36c that extends between the top and bottom surfaces 36b, 36a of the upper portion 36. The housing 36c comprises a generally hollow or at least partially hollow, rectangular member that is sized to support the weight of the crop sprayer 10 and to internally receive the actuators 38 and a pair of guide members 40, described in more detail below. In other examples, the housing 36c may comprise a plurality of plates, square tubes, circular tubes, solid blocks or another suitable members. The housing 36c may be formed from any suitable material having the desired mechanical properties, including steel, iron, titanium, aluminium, other metals, alloys, plastics and composite materials.

In the present example, the frame 12 includes a wheel mount 13 extending laterally outward and the upper portion 36 is pivotally coupled to the wheel mount 13. The pivot joint connection includes a U-shaped yoke or bracket 37, or optionally a pair of complimentary bracket portions that straddle the wheel mount 13. A pin may extend through the wheel mount 13 and the two brackets 37 to provide a rotatable straddle joint. In other examples, the upper portion 36 of the adjustable wheel support 30 may be pivotally coupled to the frame 12 using any known pivot connection mechanism.

In addition to the actuators 38, the upper and lower portions 36, 34 of the adjustable wheel support 30 are connected by a pair of spaced apart, upright guide members 40. In the present example, the guide members 40 are separated by and generally aligned with the actuators 38. Placing the actuators 38 and the guide members 40 in this aligned or planar configuration enables the adjustable wheel support 30 to be relatively narrow, which may allow the wheel support 30 to more easily pass between rows of crops. In other examples, the guide members 40 may be located between the actuators 38 or the actuators 38 and guide members 40 may be in a non-aligned configuration.

In the present example, each guide member 40 is coupled to both the lower portion 34 and the upper portion 36. Each guide member 40 comprises an elongated member 42, connected to and extending upward from the lower portion 34, which is slidably received within a corresponding sleeve 44 in the upper portion 36. The elongated member 42 may be hollow or solid and may have any suitable cross-sectional shape, including circular, square, rectangular, polygonal or triangular. The elongated member 42 may be formed from metal, plastic or any other suitable material.

When the actuators 38 extend axially toward their extended position, raising the upper portion 36 away from the lower portion 34, the guide members 40 serve to guide the movement between the upper and lower portions 36, 34 and to retain the lower portion 34 in a desired lateral or horizontal position or alignment relative to the upper portion 36. The guide members 40 may also resist shear loads, torque loads and bending or moment loads exerted on the wheel support, which may reduce non-axial loading on the actuators 38.

In the present example, elongated members 42 are closely received within their respective sleeves 44 so that the members 42 can slide in the vertical direction and are restrained in the horizontal directions (i.e. front to back and left to right relative to the crop sprayer 10 as shown in FIGS. 1 and 2). Accordingly, the members 42 can freely slide relative to the upper portion 36 when the actuators 38 are activated but are restricted from translating in a horizontal direction relative to the upper portion 36. In this configuration, the elongated member 42 and the sleeve 44 may provide structural support to resist horizontal shear loads (i.e. from contacting the ground, travelling along a side hill or driving over rocks or other obstacles) and rotational or torque loads (i.e. from steering forces or from driving along a rut or trough in the ground). The telescopic nesting of the member 42 within its sleeve 44 also provides resistance to bending or moment loads placed on the adjustable wheel support 30 in use.

The use of guide members 40 in the adjustable wheel support 30 may reduce the shear, torque and moment forces transferred to the actuators 38. Reducing the non-axial loading on the actuators 38 may enable smaller, lighter actuators to be used and may reduce the likelihood of bending, warping or otherwise breaking or damaging the actuators 38. Providing a pair of spaced apart guide members 40 may help balance the loading experienced by each guide member 40, as described above in relation to the positioning of the actuators. Alternatively, the adjustable wheel support 30 may comprise one guide member or more than two guide members, or optionally the actuators 38 may be designed to resist shear, torque and moment loads and the adjustable wheel support 30 may not comprise any separate guide members.

The strength and stiffness of the guide members 40 may relate to the amount of overlap between the members 42 and the sleeves 44 (i.e. the length of member 42 received within the sleeve 44). In some examples, the guide members 40 are configured such that there is approximately 100% overlap of the elongated members 42 within their sleeves 44 when the adjustable wheel support 30 is in both the raised and lowered positions. In the present example, each member 42 has a length of approximately 40 inches and each sleeve 44 has a length of approximately 20 inches. When the adjustable wheel support 30 is in the lowered position, as shown in FIGS. 3, 9 and 10, the lower 20 inches of the elongated member 42 is received within the sleeve 44, with an extra 20 inches extending above the top of the sleeve 44. When the adjustable support is moved to the extended position, as shown in FIGS. 6, 7 and 8, the upper 20 inches of the elongated member 42 are received within the sleeve 44, and the lower 20 inches of the elongated member are exposed, extending between the upper and lower portions 36, 34. In other examples, the overlap between the elongated member 42 and the sleeve 44 may be less than 100% in either or both of the raised and lowered positions.

The outer surface of the member 42 and/or the interior surface of the sleeve 44 may have a low friction coating such as, grease, oil, graphite or Teflon™. This may reduce the internal sliding friction between the member 42 and the sleeve 44. Alternatively, or in addition, the member 42 or sleeve 44 may be greased or otherwise lubricated to further reduce the sliding friction therebetween.

In other examples, the guide member 40 may have other configurations. For example, the guide member 40 may have a telescopic construction including an elongated member extending downward from the upper portion 36 that is slidably received within an elongate aperture or sleeve within the lower portion 34. In another example, the guide member 40 may include a channel extending upward from the lower portion 34 that is shaped to receive an elongated key portion located on the upper portion 36 such that the elongated key portion can slide within the channel.

In the present example, the adjustable wheel support 30 includes a support plate or spacer 50 that is coupled to the lower portion 34 and the upper portion 36. When the crop sprayer 10 is in its first or lowered position, as shown in FIGS. 1, 3, 9 and 10 the spacer 50 is in a storage position in which it extends laterally inward from the adjustable wheel support 30. Optionally, when the spacer 50 is in the storage position it may be completely removed or detached from the adjustable wheel support 30. For example, the spacer 50 may be coupled to the upper portion 36 using a removable fastener, such as a bolt, a pin, or another suitable fastener. This allows the spacer 50 to be removed when it is not supporting the upper portion 36 in the second position. Removing the spacer 50 may reduce damage to crops or other objects that may otherwise impact against the spacer 50 when operating the vehicle 10 at the first height 21.

When the crop sprayer 10 is in its second or raised position, as shown in FIGS. 2, 6, 7 and 8, the spacer 50 is in its use position, in which it is positioned between and is substantially aligned with the upper and lower portions 36, 34.

In the first or lowered position, the ground clearance 19 of the frame 12 is at its first height 21 which may be between approximately 20 and 58 inches. In the second or raised position the spacer 50 spaces apart or separates the lower portion 34 and the upper portion 36 so that length of the adjustable wheel support 30 is increased by a distance that is generally equal to the height 55 of the spacer 50 and the ground clearance 19 of the frame 12 has a second height 23. The second height 23 is greater than the first height 21 by an amount that is generally equal to the height 55 of the spacer 50, and in some examples is between 32 and 75 inches. In the present example, the first height 21 is approximately 48 inches and, if the spacer 50 has a height 55 of 20 inches, the second height 23 is approximately 68 inches. These heights generally allow the crop sprayer 10 to be operated and transported at a lowered height (e.g. the first height 21 of 48 inches), and at high clearance or raised height (e.g. the second height 23 of 68 inches). The second height 23 is generally sufficient enable the crop sprayer 10 to spray corn when the corn has grown to a tassel stage/height.

In examples where the adjustable wheel supports 30 are installed as replacement parts on a particular crop sprayer (or model of crop sprayer), when the crop sprayer 10 is in the lowered position, the ground clearance 19 of the crop sprayer 10, and accordingly its overall height, may be generally the same (i.e. within 3 inches) as the stock ground clearance 19 of the particular crop sprayer. In other examples (e.g. when the adjustable wheel supports are an integral feature of the production crop sprayer) the ground clearance 19 in the lowered position may be equal to or less than the ground clearance 19 of a comparable, fixed-height crop sprayer.

In some examples, there may be multiple spacers 50 having different heights 55. Each different spacer may provide the crop sprayer 10 with a different height when moved into the use position. For example, a first spacer 50 may provide the frame 12 with a second height 23 of 60 inches while another spacer 50 having a different height may provide the frame 12 with a second height 23 of 64 inches. A machine operator may be provided with a variety of spacers 50, of differing heights 55 to allow operation of the crop sprayer 10 at a variety of different ground clearances 19.

The spacer 50 is generally sized and shaped to support the upper portion 36 while resting on the lower portion 34. For example, the spacer 50 may be a generally U-shaped channel member extending from a first end 50*a* to a second end 50*b*. The channel member may have a cross-section that generally corresponds to the shape and size of a portion of the support surface 34*a* and a portion of the bottom surface 36*a*. Accordingly, the spacer 50 may support the upper portion 36 in the second position such that the first end 50*a* mates with the support surface 34*a* and the second end 50*b* mates with a portion of the bottom surface 36*a*. In the second position, the actuators 38 and guide members are received within the interior U-shaped volume of the spacer 50. In this configuration, the guide members 40 and actuators 38 may be shielded from contacting the crops as the crop sprayer 10 travels through a field. Reducing the crop contact with the actuators 38 and guide members 40 may reduce crop damage, reduce entanglement of the crops within the adjustable wheel support 30 and reduce fouling of the actuators 38 and guide members 40. In other examples, some or all of the guide members 40 and actuators 38 may be located outside of the spacer 50 when the spacer 50 is in the use position and the adjustable wheel support is in the raised position.

In the present example, the spacer 50 also comprises angled or slanted end faces 57 for deflecting crops that may contact the end faces 57 of the spacer 50 when the crop sprayer 10 is in use. The slanted end faces 57 may guide the crops around spacer 50 and may reduce damage to the crops and the likelihood of crop entanglement with the adjustable wheel support 30. In other examples, the end faces 57 may have a greater slope or may by flat.

Optionally, the spacer 50 may have different shapes and configurations. For example, the spacer 50 may include a member having rectangular or circular cross section. The member may be located between two guide members 40 when the spacer 50 is in the second position.

To enable relative movement between the spacer 50 upper and lower portions 36, 34, the spacer 50 is coupled to the upper portion 36 using a pin in slot connection 53. In the present example, the spacer 50 includes a pair of opposing support brackets 52 that extend outward from the second end 50*b* of the spacer 50, adjacent opposing ends of the upper portion 36. The pin and slot connection 53 comprises a pin 80 extending from each end of the upper portion 36 and the pin is slidably and rotatably received within a corresponding slot 82 formed in each support bracket 52. The pin 80 may be any suitable type of projection, such as a boss, bolt, screw, dowel or other generally round protrusion. The pin 80 may be integral to the upper portion 36, or may be a separate element. The slot 82 has a slot length 84 and is sized to provide a guide path along which the pin slides and in which the pin pivots.

Coupling the spacer 50 to the upper portion 36 in the manner described above allows the spacer 50 to move between its storage and use positions. For example, as shown in FIGS. 3-12, the spacer 50 may pivot clockwise about pin and slot connection 53 from a generally horizontal orientation in the storage position (FIGS. 3 and 10) to a generally vertical, aligned orientation in the use position (FIGS. 6 and 8). Pivoting the spacer 50 in this fashion positions the spacer 50 beneath the frame 12 when the spacer 50 is in the storage position, which may make the crop sprayer suitable for on road travel.

Figure 4:
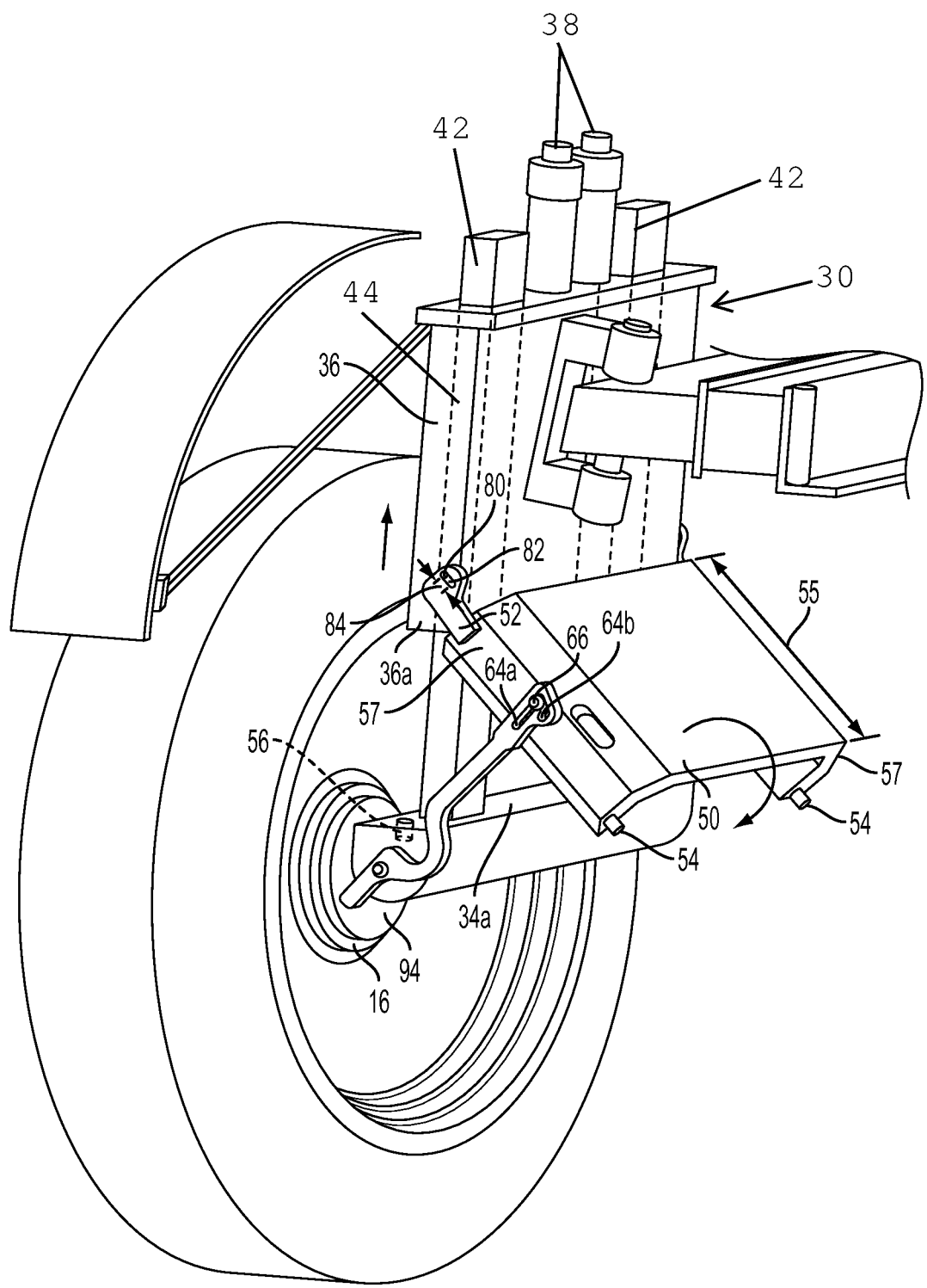
FIG. 4 is a perspective view of the wheel support of FIG. 3 with the spacer in an intermediate position.
Figure 5:
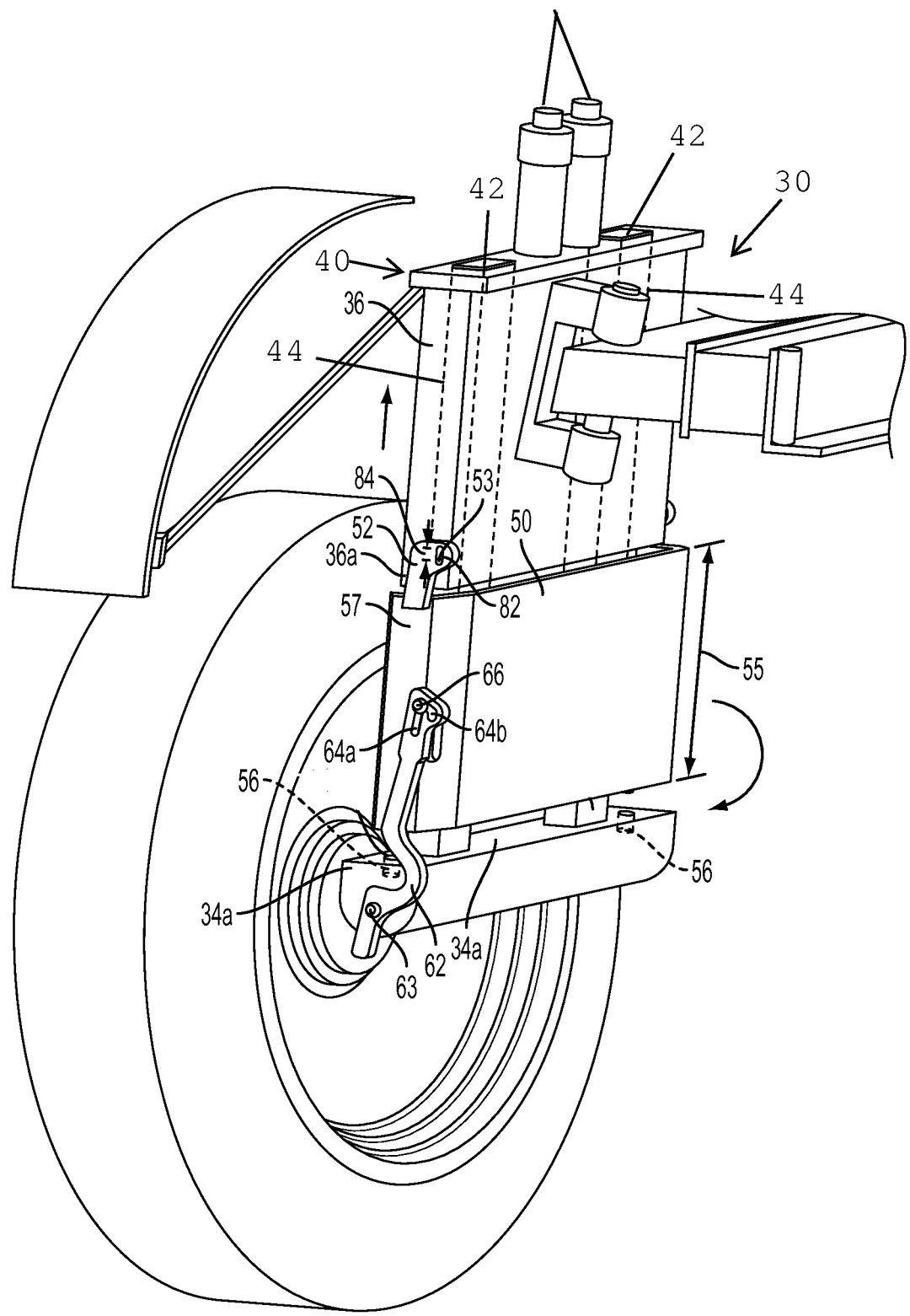
FIG. 5 is a perspective view of the wheel support of FIG. 3 with the spacer in an over-raised position.

The slot length 84 is selected so that, as the upper portion 36 moves upward relative to the lower portion 34, the spacer 50 translates to a position in which the spacer 50 can pivot into position beneath the upper portion 36 without impacting or interfering with the lower surface 36a, or any other portion of the upper portion 36, as best shown in FIGS. 4 and 5. Once the spacer 50 has pivoted into position in its aligned position (for example as shown in FIG. 5), the pin 80 remains slidable within slot 82 so that the spacer 50 can translate upward into the final raised position and the spacer 50 is disposed in its use position (see for example FIGS. 6, 7 and 8). In other examples, the spacer 50 may be connected to the upper portion 36 using any suitable connection device that allows the desired rotation and translation of the spacer 50 relative to the upper portion 36.

Referring to FIG. 3, the adjustable wheel support 30 may also include a linkage assembly 60 connecting the lower portion 34 to the spacer 50. The linkage assembly 60 is generally configured to guide the spacer 50 between the storage position and the use position when the actuators 38 raise or lower the upper portion 36. In the present example, the linkage assembly 60 comprises a connecting rod 62 that is pivotally coupled to the lower portion 34 at a pivot 63. The pivot 63 preferably comprises a bolt extending from the lower portion 34 that is received in a corresponding hole in the connecting rod 62.

The connecting rod 62 also comprises a groove 64 shaped to receive a pin 66 that extends outward from the end 57 of the spacer 50. The groove 64 has a lift portion 64a and a catch portion 64b that extends generally transversely from the lift portion 64a. The lift portion 64a and the catch portion 64b are generally sized and shaped to guide the spacer 50 between the storage and use positions.

As illustrated in FIG. 3, when the adjustable wheel support 30 is in the lowered position, the lower portion 34 engages and supports the upper portion 36 such that the support surface 34a of the lower portion 34 abuts the bottom surface 36a of the upper portion 36. In this configuration, the spacer 50 is located in its storage position and has a generally horizontal orientation. The following describes the operation of the adjustable wheel support 30 from the first or lowered position to the second or raised position and the corresponding movement of the spacer 50 from its first position to its second or aligned position.

To begin the raising operation, a machine operator activates the actuators 38 on one or more of the adjustable wheel supports 30. In the present example, each adjustable wheel support 30 can be independently activated, allowing the machine operator to independently control the position of each adjustable wheel support 30. Using this independent control, the machine operator may raise all of the adjustable wheel supports 30 simultaneously (or in sequence) to evenly raise the frame 12 of the crop sprayer 10 above the ground. Optionally, the machine operator may choose to activate only a portion of the adjustable wheel supports 30 (e.g., only the front adjustable wheel supports or only the left side adjustable wheel supports) to change the orientation of the frame 12 relative to the level ground. Such configurations may be useful for servicing the crop sprayer or for operating the crop sprayer on uneven terrain, such as along a side hill, where an uneven extension of the adjustable wheel supports 30 may enable a machine operator to keep the frame 12 generally horizontal even if the wheels are at different positions along the hill or grade.

The control of the adjustable wheel supports 30 may be accomplished using a dedicated control system (including electronics, hydraulic components, switches and operator controls) or may be integrated with existing crop sprayer control systems and operator controls (i.e. the existing operator controls used to adjust lateral wheel spacing). In some examples, control of the adjustable wheel supports 30 may be at least partially automated based on sensor information or other machine data that is fed into a system controller. For example, a system controller may receive machine location information from an onboard GPS (global position system) device and compare the machine location to a map of the field or other are being sprayed. The map of the field may include topographic information, including the location of a side hill. When the crop sprayer is in use, the adjustable wheel supports may be automatically adjusted to level the frame 12 as the crop sprayer reaches the side hill identified on the map. In another example, an operator may be presented with a list of crops to be sprayed and, based on the season, when a particular crop is selected the system may automatically move the adjustable wheel supports 30 to the proper height as recommended by the manufacturer. Other examples of sensors include location sensors, height sensors, mercury switches, orientation sensors, speed sensors and crop recognition sensors (not shown).

When the machine operator activates the wheel support 30, the actuators 38 are energized and begin to raise the upper portion 36 relative to the lower portion 34. As the adjustable wheel support 30 extends, the spacer 50 begins rotating about the pivot connection 53, and the connecting rod 62 begins rotating about the pivot 63. During this initial movement phase, the pin 66 remains in the catch portion 64b of the groove 64 at the end furthest from the lift portion 64a.

As adjustable wheel support 30 continues to extend, the upper portion 36 continues rising relative to the lower portion 34, the pin 66 eventually slides along the catch portion 64b toward the lift portion 64a as shown in FIG. 4. This may be referred to as an intermediate position of the adjustable wheel support 30. To enable additional extension of the adjustable wheel support 30 and translation of the spacer 50 relative to the connecting rod 62, the machine operator moves the connecting rod 62 so that the pin 66 on the spacer 50 is released from the catch portion 64b of the groove 64 and aligned with the lift portion 64a. Once the connecting rod 62 for each spacer 50 has been disengaged in this manner, the adjustable wheel support 30 can be further extended. Alternatively, the connecting rods 62 may automatically shift from a catch position to a lift position, or the connecting rods may be configured such that adjustment is not necessary during the raising or lowering process.

As the adjustable wheel support 30 is further extended, the spacing between the support surface 34a and the bottom surface 36a becomes greater than the height 55 of the spacer 50. In this position, as illustrated in FIG. 5, the adjustable wheel support 30 is in an over-extended configuration. In the over-extended configuration, the spacer 50 can translate downward relative to the upper portion 36 and pivot into a generally aligned position, between the upper and lower portions 36, 34 (via the slot and pin connection described above).

While the linkage 60 is generally configured to automatically align the spacer with the support surface 34a and the bottom surface 36a, a guidance and retention mechanism (not shown) may assist with alignment and securment of the spacer 50. In some examples, the guidance mechanism may include magnets and guide pins that help align the spacer 50 relative to the support surface 34a and the bottom surface 36a while still allowing vertical translation of the spacer 50. Furthermore, the machine operator may help guide the spacer 50 into position.

Alignment of the spacer 50 when the adjustable wheel support 30 is in the over-extended position may also assist in the alignment and coupling of the spacer 50 securment or locking mechanism. In the present example, the locking mechanism comprises a pair of tabs or bosses 54 extending from the bottom of the spacer 50 that are shaped to be received within corresponding holes or slots 56 located on the support surface 34a.

When the spacer 50 is in the aligned position, aligned with the support surface 34a and the bottom surface 36a, the actuators 38 are retracted from the over-extended position to the operational raised position. As the actuators 38 are retracted the upper portion 36 moves downward, toward the lower portion 34, and the spacer 50 also translate downwards with the upper portion 36. As the spacer 50 translates downwards, the pin 66 slides downward in the groove 64 through the lift portion 64a away from the catch portion 64b and the bosses 54 slide into the corresponding slots 56. When the adjustable wheel support 30 reaches the second or raised position, as illustrated in FIGS. 6, 7 and 8, the spacer 50 is in the use position and is locked in place between the upper and lower portions 36, 34, because horizontal movement of the spacer 50 is inhibited by the engagement of the bosses 54 within the slots 56 and the engagement of the pin 80 within slot 82, and rotation of the spacer 50 is inhibited by the retention of bosses 54 within slots 56. The lift portion 64a of the groove 64 and the pin 66 may also cooperate so as to prevent side-to-side movement of the spacer 50, which may increase the structural strength and stability of the adjustable wheel support 30.

When moving the spacer 50 from the use position to the storage position, a similar procedure is followed in reverse. First the actuator 38 raises the upper portion 36 to the over-raised position as in FIG. 5 such that the pin 66 rises along the lift portion 64a of the groove toward the catch portion 64b and the bosses 54 are lifted out of the slots 56 in the support surface 34a.

The guidance mechanism or the operator may then push the spacer 50 outward (overcoming the magnetic attraction force in examples that comprise alignment and securment magnets) from the space between the support surface 34a and the bottom surface 36a, so as to move the spacer 50 to an intermediate position, which is generally similar to the intermediate position shown in FIG. 5. In the intermediate position, the connecting rod 62 may be shifted (automatically or by the machine operator) so that the pin 66 moves from the lift portion 64a to the catch portion 64b. As the actuators 38 continue to lower or contract the adjustable wheel support 30, the connecting rod 62 urges the spacer 50 to pivot toward the generally horizontal, storage position, shown in FIGS. 3 and 10.

Alternatively, as described above, the spacer 50 may be guided or biased by any other suitable connectors, or the spacer 50 may be removed or detached from the adjustable wheel support 30 for storage. In other examples, the groove 64 may be located on the spacer 50 and the pin 66 may be located on the connecting rod, or the linkage 60 may include a plurality or system of linkage members that cooperate to guide the spacer 50 between the first position and the second position.

In some embodiments, the linkage 60 may be pivotally coupled to the upper portion 36 and the spacer 50 may be pivotally coupled to the lower portion 34.

In the present example, when the adjustable wheel support 30 is in the lowered position, the upper portion 36 extends away from the frame along an upper portion axis that is vertically inclined at a first angle 90 relative to a vertical axis, so that the wheels 18 are laterally further from the frame 12 than the connection between the upper portion 36 and the frame. Inclining the adjustable wheel support 30 at the first angle 90 enables the wheels 18 to be spaced at a predetermined or standardized wheel spacing distance 22a (for example 120 inches between the wheels) so that the wheels 18 will pass between adjacent rows of crops, instead of running over the crops. In some examples, the first angle 90 may be between 7 and 25 degrees, and optionally may be 18 degrees.

If the lower portion 34 of the wheel support 30 were simply extended along the same axis as the upper portion 36, at the first angle 90, when it was moved into the raised position, opposing ones of the wheels 18 may have an undesirable spacing such that they are not separated by the predetermined crop spacing distance (e.g. the wheel may be too widely spaced to fit between standard crop rows). To enable the spacing between opposing wheels 18 to remain compatible with the spacing between planted rows of crops when the crop sprayer is in the raised configuration, the lower portion 34 of the wheel support 30 extends away from the upper portion 36 along a different, second axis that is at a steeper angle 92 (relative to the vertical axis). When the wheel support 30 is extended, opposing wheels 18 can be separated by a second wheel spacing distance 22b. The second wheel spacing distance 22b can be larger than the distance 22a between the wheels 18 in the lowered configuration, but the second wheel spacing distance 22b is also compatible with standardized crop planting distances.

Optionally, to provide a desired second wheel spacing distance 22b, the actuators 38, elongated members 42 and spacer 50 (once locked in the raised configuration) may be extend along respective axes parallel to the second angle 92. In some examples the second angle 92 is between 5 and 20 degrees and optionally, the second angle is 13 degrees.

When providing the wheel support 30 as a kit for retrofitting an existing vehicle (or when a crop sprayer is manufactured including integral adjustable wheel supports) other modifications to the vehicle may be made. For example, the modifications may include adjusting or replacing crop guards, extending the ladder leading to the operator cabin, and adding a sliding product inductor that slides to a reachable position when the crop sprayer 10 is in the raised position to allow refilling of the agent within a storage tank in the vehicle.

In some embodiments, the crop sprayer 10 or the retrofit kit may include a speed limiter that limits the driving speed of the crop sprayer 10 when it is in the upper or raised position. For example, the speed limiter may only allow the crop sprayer to operate in first gear when raised. This may improve the safety of the crop sprayer 10, which may less balanced or stable while operating in a raised position at higher speeds.

In the present example, the crop sprayer 10 or retrofit kit may comprise one or more fenders 70 coupled to the upper portion 36, or coupled to the frame 12. When the upper portion 36 is in the lowered position, the fenders 70 may cover a portion of the wheels 18, which may be legally required in order to drive the vehicle on a roadway. When the upper portion 36 is raised, as shown in FIG. 2, the fenders 70 also rise above the wheels 18 with the frame 12 which may raise the fenders 70 partially or completely above the crops being sprayed. Elevating the fenders 70 at least partially above the crops being sprayer may reduce the interference or contact between the fenders 70 and the crops and may reduce crop damage and fender fouling 70. The fenders 70 may tend to damage crops if they remained lowered so as to cover a portion of the wheels 18. In other examples, the crop sprayer 10 may be configured so that the fenders 70 are mounted to the lower portion 34 or the wheel assembly so that the fenders 70 remain in proximity to the wheels 18 when the crop sprayer 10 is in the raised configuration.

Optionally, in addition to or as an alternative to the spacer, one or more of the guide members can be releasably secured to the upper portion to lock the upper portion in the extended configuration and to carry at least a portion of the load exerted by the upper portion. Optionally, guide member can be secured to the upper portion using a load bearing pin or other releasable type of fastener.

While the above description provides examples of one or more apparatus, systems or methods, it will be appreciated that apparatus, systems or methods may be within the scope of the accompanying claims.

The invention claimed is:

1. A height adjustable wheel support apparatus connectable to a wheel assembly and a frame of a vehicle, the apparatus comprising:
   an upper portion connectable to the frame of the vehicle;
   a lower portion connectable to the wheel assembly;
   an actuator configured to move the upper portion between first and second positions;
   a spacer having a first and an opposing second end, wherein the spacer is movable between a storage position and a use position, wherein in the use position, the spacer is disposed between the upper and lower portions;
   wherein, when the upper portion is in the first position the spacer is in the storage position and a downward facing bottom surface of the upper portion bears against a support surface on the lower portion; and
   wherein, when upper portion is in the second position, the upper portion and lower portion are spaced apart and the spacer is in the use position, wherein the first end of the spacer bears against the lower portion and the second end of the spacer bears against the upper portion to carry at least a portion of a load exerted by the upper portion.

2. The apparatus of claim 1, wherein in the second position, the upper portion and lower portion are spaced apart by a spacer height, wherein the upper portion is moveable to a third position where the upper and lower portions are spaced apart by a distance greater than the spacer height.

3. The apparatus of claim 2, wherein the spacer is releasable from the use position when the upper portion is in the third position, wherein the spacer is releasably locked in the use position between the upper and lower portions when the upper portion is in the second position.

4. The apparatus of claim 1, wherein the spacer is pivotably and translatably connected to the upper portion.

5. The apparatus of claim 4, wherein the upper portion comprises a pair of pins extending from opposing faces of the upper portion and the spacer comprises a corresponding pair of support brackets, each support bracket defining a slot therein to slidably and rotatably receive one of the pins.

6. The apparatus of claim 1, further comprising a linkage assembly operably connecting the spacer to the lower portion, wherein the linkage assembly is adapted to guide the spacer between the storage position and an intermediate position when the upper portion is moved relative to the lower portion.

7. The apparatus of claim 6, wherein the linkage assembly comprises a connecting rod pivotally connected to one of the spacer and the lower portion, the connecting rod defining a slot therein to slidably receive a pin provided on the other of the spacer and the lower portion.

8. The apparatus of claim 7, wherein the slot in the connecting rod comprises a lifting portion and a catch portion, the lifting portion configured to slidably receive the pin and the catch portion configured to receive the pin to retain the spacer in the intermediate position.

9. The apparatus of claim 1, wherein the first end of the spacer comprises one of a boss and a complimentary slot and the lower portion comprises the other of the boss and the slot, the boss being received in the slot when the upper portion is in the second position.

10. The apparatus of claim 9, wherein the boss is disengaged from the slot when the upper portion is in the third position, wherein the boss is adapted for insertion into the slot by the movement of the upper portion from the second position to the third position.

11. The apparatus of claim 1, wherein when spacer is in the use position, the spacer carries a greater load than the actuator.

12. The apparatus of claim 1, where the actuator is substantially unloaded when the upper portion is in the first position and the second position.

13. The apparatus of claim 1, wherein the spacer defines an interior volume, wherein when the spacer is in the use position, at least a portion of the actuator is contained within the interior volume.

14. The apparatus of claim 1, further comprising a guide member extending from the lower portion to the upper portion, wherein the guide member is adapted to carry at least a portion of at least one of shear, bending and torque loads exerted by the frame, wherein the guide member extends generally parallel to the actuator.

15. The apparatus of claim 14, wherein the guide member comprises an elongated member extending between the upper and lower portions, wherein the elongated member is slidably received within a sleeve in the upper portion.

16. The apparatus of claim 15, wherein the elongated member has a member length and the corresponding sleeve has a sleeve length that is less than the member length, wherein the elongated member is at least partially received within the sleeve when the upper portion is in each of the first, second and third positions.

17. The apparatus of claim 16, further comprising a first guide member and a generally parallel second guide member, the second guide member being spaced apart from the first guide member, wherein the first and second guide members are generally parallel to the actuator, wherein the first and second guide members are oriented co-planar with the actuator, wherein the actuator is located between the first and second guide members.

18. The apparatus of claim 1, further comprising a first actuator and a second actuator, wherein the first and second actuators are positioned on opposite sides of an axis of rotation of the wheel assembly.

19. The apparatus of claim 1, wherein the upper portion extends along a first axis and the lower portion moves relative to the upper portion along a second axis, wherein the second axis is disposed at an angle to the first axis.

20. The apparatus of claim 19, wherein the first axis is at a first acute angle relative to a vertical axis and the second axis is at a second acute angle relative to the vertical axis, the second angle being smaller than the first angle.

21. The apparatus of claim 1, wherein the spacer is removably connected to at least one of the upper and lower portions and is separable from the upper and lower portions when the spacer is in the storage position.

22. A height adjustable crop spraying vehicle comprising:
   a frame;
   a liquid holding tank supported by the frame and in fluid communication with at least one spraying boom mounted to the frame;
   a plurality of wheels adapted to rollingly support the frame; and
   an plurality of height adjustable wheel supports connecting each wheel to the frame, each wheel support being selectably adjustable to vary the elevation of the frame relative to the ground, each wheel support comprising:
an upper portion connected to the frame;
a lower portion connected to one of the plurality of wheels;
an actuator configured to move the upper portion relative to the lower portion between a first position and a second position;
a spacer moveable between a storage position and a use position, wherein in the use position, the spacer is disposed between the upper and lower portions to transfer at least a portion of a load exerted by the frame from the upper portion to the lower portion;
wherein, when the upper portion is in the first position a bottom surface of the upper portion bears against a support surface of the lower portion and the vehicle is in a lowered configuration;
wherein, when the upper portion is in the second position, the spacer is in the use position, wherein a first end of the spacer bears against the support surface, and an opposing second end of the spacer supports the bottom surface of the upper portion, and the vehicle is in a raised configuration.

23. The vehicle of claim 22, wherein the upper portion is moveable beyond the second position to a third position in which a distance between the bottom surface and the support surface is greater than a spacer height.

24. The vehicle of claim 23, wherein the spacer is positionable between the upper and lower portions when the upper portion is in the third position, wherein the spacer is restrained from movement between the upper and lower portions when the upper portion is in the second position.

25. The vehicle of claim 22, wherein the plurality of wheels comprises a pair of opposing, spaced apart steerable front wheels and a pair of opposing, spaced apart rear wheels.

26. The vehicle of claim 25, wherein the upper portion of the wheel support extends from the frame along a first axis at a first angle relative to a vertical axis, wherein the lower portion is moveable relative to the upper portion along a second axis at a second angle relative to the vertical axis, wherein the second angle is smaller than the first angle, wherein when the vehicle is in the lowered configuration opposing ones of the plurality of wheels are spaced apart by a first width to accommodate a predetermined spacing between rows of crops, and wherein when the vehicle is in the raised configuration the opposing ones of the plurality of wheels are spaced apart by a second width that is different than the first width and can also accommodate the predetermined spacing so the opposing ones of the plurality of wheels can fit between the rows of crops when the vehicle is in the raised configuration.

27. The vehicle of claim 22, wherein each wheel support is independently controllable and can be adjusted independently of any of the other wheel supports.

28. The vehicle of claim 22, wherein the spacer defines an interior volume and at least a portion of the corresponding actuator is disposed within the interior volume when the spacer is in the second position.

29. The vehicle of claim 22, wherein the spacer further comprises an angled end face extending between the first and second ends, wherein the end face is configured to guide crops around the spacer when the vehicle moves through a field.

30. A height adjustable wheel support apparatus connectable to a wheel assembly and a frame of a vehicle, the apparatus comprising:
an upper portion connectable to the frame of the vehicle;
a lower portion connectable to the wheel assembly;
an actuator configured to move the upper portion between first and second positions;
a guide member extending from the lower portion and slidably received within the upper portion, wherein the guide member is securable to the upper portion,
wherein, when the upper portion is in the first position, a bottom surface of the upper portion bears against a support surface of the lower portion; and
wherein, when the upper portion is in the second position, the bottom surface of the upper portion is spaced apart from the support surface of the lower portion and the guide member is releasably secured to the upper portion to carry at least a portion of the load exerted by the upper portion.

* * * * *